(12) United States Patent     (10) Patent No.: US 8,089,888 B2
Krishnamurthi et al.     (45) Date of Patent: Jan. 3, 2012

(54) METHOD AND APPARATUS FOR TESTING TRAFFIC AND AUXILIARY CHANNELS IN A WIRELESS DATA COMMUNICATION SYSTEM

(75) Inventors: Rajeev Krishnamurthi, San Diego, CA (US); Rajesh K. Pankaj, San Diego, CA (US); Bibhu Mohanty, San Diego, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1205 days.

(21) Appl. No.: 10/015,926

(22) Filed: Dec. 10, 2001

(65) Prior Publication Data

US 2003/0142629 A1    Jul. 31, 2003

(51) Int. Cl.
*H04L 12/26* (2006.01)

(52) U.S. Cl. .............. 370/250; 370/252; 455/115.1; 455/226.1

(58) Field of Classification Search .............. 370/242, 370/252, 249, 389, 253, 250; 455/423, 115.1, 455/226.1
See application file for complete search history.

(56) References Cited

U.S. PATENT DOCUMENTS

| | | | | | |
|---|---|---|---|---|---|
| 3,860,769 | A | * | 1/1975 | Pachynski, Jr. | 370/249 |
| 3,922,508 | A | * | 11/1975 | Brady | 714/716 |
| 4,156,183 | A | * | 5/1979 | Schuon | 324/76.17 |
| 4,685,102 | A | * | 8/1987 | Lewis | 370/249 |
| 5,271,000 | A | * | 12/1993 | Engbersen et al. | 370/244 |
| 5,357,557 | A | * | 10/1994 | Sakakura | 379/27.06 |
| 5,475,732 | A | * | 12/1995 | Pester, III | 379/32.01 |
| 5,521,904 | A | * | 5/1996 | Eriksson et al. | 370/249 |
| 5,555,266 | A | * | 9/1996 | Buchholz et al. | 370/347 |
| 5,570,357 | A | * | 10/1996 | van Tetering et al. | 714/712 |
| 5,636,212 | A | * | 6/1997 | Ikeda | 370/233 |
| 5,742,589 | A | * | 4/1998 | Murata | 370/249 |
| 5,768,689 | A | * | 6/1998 | Borg | 455/67.14 |
| 5,784,406 | A | * | 7/1998 | DeJaco et al. | 375/224 |

(Continued)

FOREIGN PATENT DOCUMENTS

JP     2003524324     8/2003

(Continued)

OTHER PUBLICATIONS

AirAccess® CDMA Network Emulation Operations Manual; Copyright 2003, Spirent Communications, Inc.*

(Continued)

*Primary Examiner* — Salman Ahmed
(74) *Attorney, Agent, or Firm* — Christopher Edwards; Michael DeHaemer; Espartaco Diaz Hidalgo

(57) ABSTRACT

Techniques to test performance of terminals and access points in CDMA data (e.g., cdma2000) systems. A framework of protocols and messages is provided to support systematic performance testing of terminals and to ensure interface compatibility. The framework comprises a Forward Test Application Protocol (FTAP) for testing forward channels and a Reverse Test Application Protocol (RTAP) for testing reverse channels. Techniques are also provided to (1) test different types of channels (e.g., traffic channels as well as auxiliary channels), (2) test bursty data transmissions, (3) support "persistence" testing (i.e., continued testing over connection and disconnection), (4) force the settings of certain auxiliary channels (e.g., so that the error rate of the channels may be determined), and (5) collect, log, and report various statistics that may be used to derive performance metrics such as throughput and packet error rate.

6 Claims, 8 Drawing Sheets

U.S. PATENT DOCUMENTS

| | | | | |
|---|---|---|---|---|
| 5,802,105 | A * | 9/1998 | Tiedemann et al. | 375/225 |
| 5,898,674 | A * | 4/1999 | Mawhinney et al. | 370/247 |
| 6,006,016 | A * | 12/1999 | Faigon et al. | 714/48 |
| 6,014,377 | A * | 1/2000 | Gillespie | 370/351 |
| 6,028,845 | A | 2/2000 | Serikawa et al. | |
| 6,031,845 | A * | 2/2000 | Walding | 370/468 |
| 6,069,876 | A * | 5/2000 | Lander et al. | 370/249 |
| 6,088,588 | A * | 7/2000 | Osborne | 455/425 |
| 6,128,284 | A | 10/2000 | Kawamura et al. | 370/241 |
| 6,169,883 | B1 * | 1/2001 | Vimpari et al. | 455/67.11 |
| 6,185,191 | B1 * | 2/2001 | Dipperstein | 370/249 |
| 6,246,471 | B1 * | 6/2001 | Jung et al. | 356/73 |
| 6,246,479 | B1 * | 6/2001 | Jung et al. | 356/419 |
| 6,249,348 | B1 * | 6/2001 | Jung et al. | 356/419 |
| 6,253,060 | B1 * | 6/2001 | Komara et al. | 455/9 |
| 6,259,911 | B1 | 7/2001 | Bims et al. | |
| 6,263,016 | B1 * | 7/2001 | Bellenger et al. | 375/222 |
| 6,272,112 | B1 * | 8/2001 | Orita | 370/243 |
| 6,320,867 | B1 * | 11/2001 | Bellenger et al. | 370/420 |
| 6,327,250 | B1 | 12/2001 | Chen et al. | |
| 6,330,599 | B1 * | 12/2001 | Harvey | 709/223 |
| 6,333,932 | B1 * | 12/2001 | Kobayasi et al. | 370/389 |
| 6,362,888 | B1 * | 3/2002 | Jung et al. | 356/419 |
| 6,373,573 | B1 * | 4/2002 | Jung et al. | 356/419 |
| 6,414,750 | B2 * | 7/2002 | Jung et al. | 356/73 |
| 6,449,041 | B1 * | 9/2002 | Jung et al. | 356/326 |
| 6,519,037 | B2 * | 2/2003 | Jung et al. | 356/419 |
| 6,542,538 | B2 * | 4/2003 | Fischel et al. | 375/224 |
| 6,583,866 | B2 * | 6/2003 | Jung et al. | 356/73 |
| 6,590,660 | B2 * | 7/2003 | Jung et al. | 356/419 |
| 6,680,913 | B1 * | 1/2004 | Malmivirta et al. | 370/249 |
| 6,687,499 | B1 * | 2/2004 | Numminen et al. | 455/423 |
| 6,766,164 | B1 * | 7/2004 | Funk et al. | 455/423 |
| 6,782,503 | B1 * | 8/2004 | Dawson | 714/739 |
| 6,791,949 | B1 * | 9/2004 | Ryu et al. | 370/254 |
| 6,799,203 | B2 * | 9/2004 | Oommen | 709/219 |
| 6,856,802 | B1 * | 2/2005 | Kinnunen et al. | 455/425 |
| 6,870,616 | B2 * | 3/2005 | Jung et al. | 356/326 |
| 6,914,637 | B1 * | 7/2005 | Wolf et al. | 348/473 |
| 6,915,955 | B2 * | 7/2005 | Jung et al. | 235/462.06 |
| 7,027,418 | B2 * | 4/2006 | Gan et al. | 370/329 |
| 7,069,186 | B2 * | 6/2006 | Jung et al. | 702/188 |
| 7,110,466 | B1 * | 9/2006 | Gopalakrishnan et al. | 375/295 |
| 7,289,604 | B2 * | 10/2007 | Bremer | 379/29.01 |
| 7,353,019 | B2 * | 4/2008 | Martin | 455/424 |
| 7,397,562 | B2 * | 7/2008 | Jung et al. | 356/419 |
| 7,403,285 | B2 * | 7/2008 | Jung et al. | 356/326 |
| 7,538,878 | B2 * | 5/2009 | Jung et al. | 356/419 |
| 7,539,489 | B1 * | 5/2009 | Alexander | 455/423 |
| 7,619,405 | B2 * | 11/2009 | Steinich et al. | 324/207.13 |
| 7,620,062 | B2 * | 11/2009 | Kobayashi | 370/433 |
| 2001/0023186 | A1 * | 9/2001 | Krishnamurthi et al. | 455/450 |
| 2001/0030748 | A1 * | 10/2001 | Jung et al. | 356/419 |
| 2001/0038453 | A1 * | 11/2001 | Jung et al. | 356/419 |
| 2001/0043330 | A1 * | 11/2001 | Jung et al. | 356/419 |
| 2002/0009053 | A1 * | 1/2002 | Sjoblom | 370/235 |
| 2002/0009134 | A1 * | 1/2002 | Fischel et al. | 375/224 |
| 2002/0028675 | A1 * | 3/2002 | Schmutz et al. | 455/424 |
| 2002/0071443 | A1 * | 6/2002 | Tsukamoto et al. | 370/433 |
| 2002/0097400 | A1 * | 7/2002 | Jung et al. | 356/419 |
| 2003/0092452 | A1 * | 5/2003 | Youngs et al. | 455/461 |
| 2003/0131297 | A1 * | 7/2003 | Fischel et al. | 714/728 |
| 2003/0142629 | A1 * | 7/2003 | Krishnamurthi et al. | 370/249 |
| 2004/0221056 | A1 * | 11/2004 | Kobayashi | 709/232 |
| 2005/0003831 | A1 * | 1/2005 | Anderson | 455/456.1 |
| 2006/0234640 | A1 * | 10/2006 | Hirvonen | 455/67.11 |
| 2007/0085726 | A1 * | 4/2007 | Steinich et al. | 342/52 |
| 2009/0147671 | A1 * | 6/2009 | Jaworski et al. | 370/216 |
| 2009/0223294 | A1 * | 9/2009 | Thomas | 73/627 |
| 2010/0031098 | A1 * | 2/2010 | Kobayashi | 714/715 |

FOREIGN PATENT DOCUMENTS

| | | |
|---|---|---|
| WO | WO0126305 | 4/2001 |
| WO | 01 52568 | 7/2001 |

OTHER PUBLICATIONS

A study of techniques for the testing of conducted susceptibility of spread spectrum systems; Sali, S.; Electromagnetic Compatibility, 1994., Ninth International Conference.*

A New Loopback GSM/DCS Bit Error Rate Test Method on Baseband I/Q Outputs; Nowakowski, Jean-Francois; Bonhoure, Bruno; Carbonero, Jean-Louis; ARFTG Conference Digest-Spring, 2001.*

International Search Report—International Search Authority—European Patent Office—PCT/US02/32910—Mar. 25, 2003.

3GPP2, Test Application Specification (TAS) for High Rate Packet Data Air Interface, Jul. 12, 2001, C.S0029-0 Version 2.0, pp. 1-58.

Kang, Chang Soon, et al., "CDMA mobile communication system performance analysis tools for network parameter planning," Vehicular Technology Conference, 1996. Mobile Technology for the Human Race, IEEE 46th, May 1, 1996, vol. 2, pp. 894-898.

European Search Report—EP10003714, Search Authority—Munich Patent Office, Jun. 1, 2010.

3GPP2, Test Application Specification (TAS) for High Rate Packet Data Air Interface (Publication Version), May 11, 2001, C.S0029-0 Version 1.0, URL, http://www.3gpp2.org/Public__html/specs/C.S0029-0 v1.0.pdf.

* cited by examiner

METHOD AND APPARATUS FOR TESTING TRAFFIC AND AUXILIARY CHANNELS IN A WIRELESS DATA COMMUNICATION SYSTEM

BACKGROUND

1. Field

The present invention relates to data communication, and more particularly to techniques for testing different types of channels in a wireless (e.g., cdma2000) data communication system.

2. Background

Wireless data communication systems such as code division multiple access (CDMA) systems, time division multiple access (TDMA) systems, frequency division multiple access (FDMA) systems, and others are widely used to provide various types of communication such as voice, data, and so on. For these systems, it is highly desirable to utilize the available resources (i.e., the available bandwidth and transmit power) as efficiently as possible. This typically entails transmitting as much data to as many users within as short a time period as supported by the conditions of the communication link.

To achieve the above goal, the performance of terminals may need to be evaluated in the factory and/or in the field. As part of a manufacturing process, the terminals may be tested to ensure that they comply with specified minimum performance criteria. And in the field, the performance of the terminals may be characterized and used to diagnose RF coverage and performance problems in the wireless data communication system.

In one conventional technique for characterizing the performance of a terminal, a known data pattern (e.g., generated by a pseudo-random number (PN) generator) is transmitted by an access point (or base station), received by the terminal, and sent back to the access point. This "loop-back" testing technique may be simple to implement but provides limited testing capabilities.

Many newer generation CDMA communication systems are capable of flexible operation. For example, data may be transmitted in bursts to the terminals, different types of data may be transmitted over different types of channels, the data rate may be allowed to vary from frame to frame on a particular channel, the processing of the data may also vary (e.g., from frame to frame and/or from channel to channel), and so on. The conventional loop-back testing technique is typically used to test a single traffic channel based on a defined set of test parameters, and may not be able to test various aspects of a newer generation CDMA system.

Moreover, different equipment vendors may support and/or implement different interfaces for testing the terminals. As a result, it is conceivable that equipment from one vendor may not be properly tested against, or in combination with, equipment from another vendor because of incompatible interfaces.

There is therefore a need in the art for techniques to test the performance of terminals and access points in CDMA systems.

SUMMARY

Aspects of the invention provide techniques to test the performance of terminals and access points in CDMA systems. A framework of protocols and messages is provided to support performance testing of terminals, and this framework ensures interface compatibility. In an embodiment, the framework comprises a forward test application protocol (FTAP) for testing forward channels and a reverse test application protocol (RTAP) for testing reverse channels. The FTAP supports the testing of a forward traffic channel (FTC) and the collection, logging, and reporting of various statistics that may be used to determine performance, and the RTAP supports the testing of a Reverse Traffic Channel and the collection of associated statistics.

Techniques are provided to perform various tests on different types of channels (e.g., traffic channels as well as auxiliary or overhead channels). These techniques support tests of bursty data transmissions. Techniques for collecting, logging, and reporting various statistics are also provided, and the collected statistics may thereafter be used to derive various performance metrics such as throughput, packet error rate (PER), and so on.

Techniques are also provided to support "persistence" in the testing (i.e., continued testing over connection and disconnection, with the variables used to store statistical information being reset only when instructed). Techniques are also provided to force the settings of certain auxiliary channels (e.g., so that the error rate of the channels may be determined). Various aspects and embodiments of the invention are described in further detail below.

The techniques described herein may be used for various applications, such as the minimum performance testing of terminals in a systematic manner (e.g., in a factory or laboratory environment) and the measurement of the forward and/or reverse link performance (e.g., in a field environment). These techniques may be used for various CDMA and wireless data communication systems, such as cdma2000, IS-95, and W-CDMA.

The invention further provides methods, apparatus (e.g., terminal and access point), and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
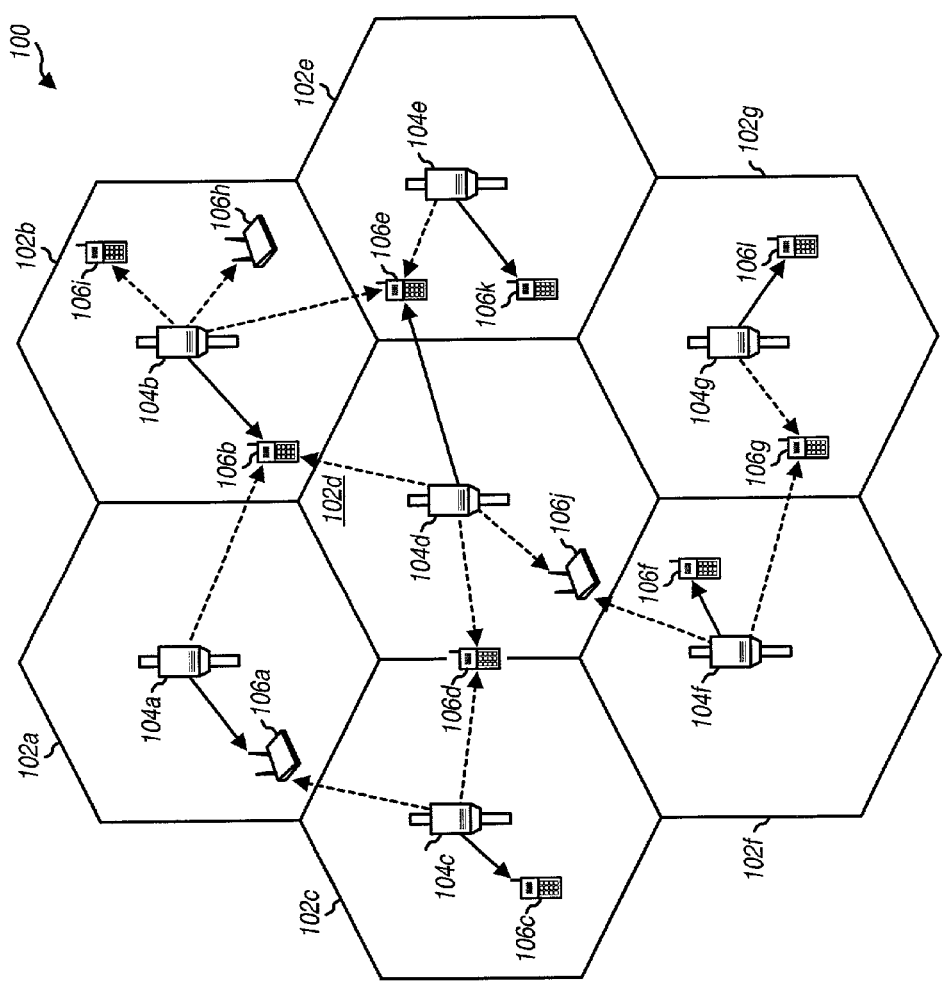
FIG. 1 is a diagram of a wireless data communication system.

FIG. 1 is a diagram of a wireless data communication system 100 wherein various aspects and embodiments of the invention may be implemented. System 100 provides communication for a number of cells 102, with each cell being serviced by a corresponding access point 104. An access point may also be referred to as a base station, a base-station transceiver system (BTS), or a Node B. Various terminals 106 are dispersed throughout the system. A terminal may also be referred to as an access terminal, a remote terminal, a mobile station, or user equipment (UE).

In an embodiment, each terminal 106 may communicate with one access point 104 on the forward link at any given moment, and may communicate with one or more access points on the reverse link depending on whether or not the terminal is in soft handoff. The forward link (i.e., downlink) refers to transmission from the access point to the terminal, and the reverse link (i.e., uplink) refers to transmission from the terminal to the access point.

In FIG. 1, a solid line with an arrow indicates a user-specific data (or simply, "data") transmission from an access point to a terminal. A broken line with an arrow indicates that the terminal is receiving pilot and other signaling but no user-specific data transmission from the access point. As shown in FIG. 1, access point 104a transmits data to terminal 106a on the forward link, access point 104b transmits data to terminal 106b, access point 104c transmits data to terminal 106c, and so on. The reverse link communication is not shown in FIG. 1 for simplicity.

System 100 may be designed to support one or more CDMA standards such as cdma2000, IS-95, W-CDMA, and others. These CDMA standards are known in the art and incorporated herein by reference. Some newer generation CDMA systems (e.g., cdma2000 1×EV systems) are capable of transmitting data in bursts and at variable data rates (e.g., as supported by the communication link). The testing techniques described herein may be able to more effectively characterize the communication link for these systems.

Figure 2A:
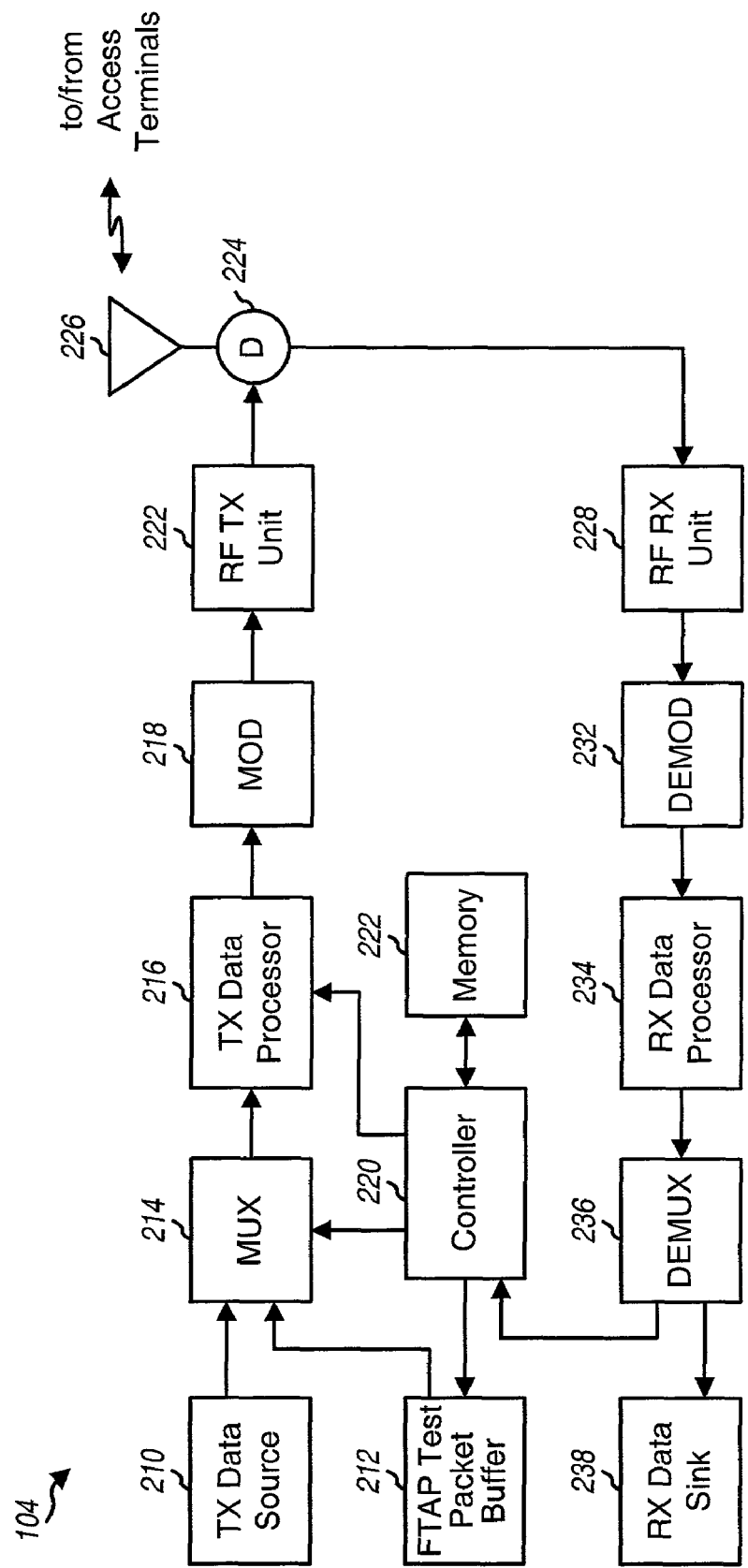
FIGS. 2A and 2B are block diagrams of an embodiment of an access point and a terminal, respectively, capable of implementing various aspects and embodiments of the invention.

FIG. 2A is a block diagram of an embodiment of access point 104, which is capable of supporting various aspects and embodiments of the invention. For simplicity, FIG. 2A shows the processing at the access point for the communication with one terminal. On the forward link, "traffic" data from a transmit (TX) data source 210 and test data from a buffer 212 are provided to a multiplexer (MUX) 214. Multiplexer 214 selects and provides the traffic data to a TX data processor 216 when operating in a normal mode, and provides both traffic and the test data when operating in a test mode. TX data processor 216 receives and processes (e.g., formats, interleaves, and codes) the received data, which is then further processed (e.g., covered and spread) by a modulator (MOD) 218. The processing (e.g., coding, interleaving, covering, and so on) may be different for each type of channel. The modulated data is then provided to an RF TX unit 222 and conditioned (e.g., converted to one or more analog signals, amplified, filtered, and quadrature modulated) to generate a forward link signal, which is routed through a duplexer (D) 224 and transmitted via an antenna 226 to the terminals. The controller 220 controls the overall test via signaling messages that are sent via multiplexer 214.

Figure 2B:
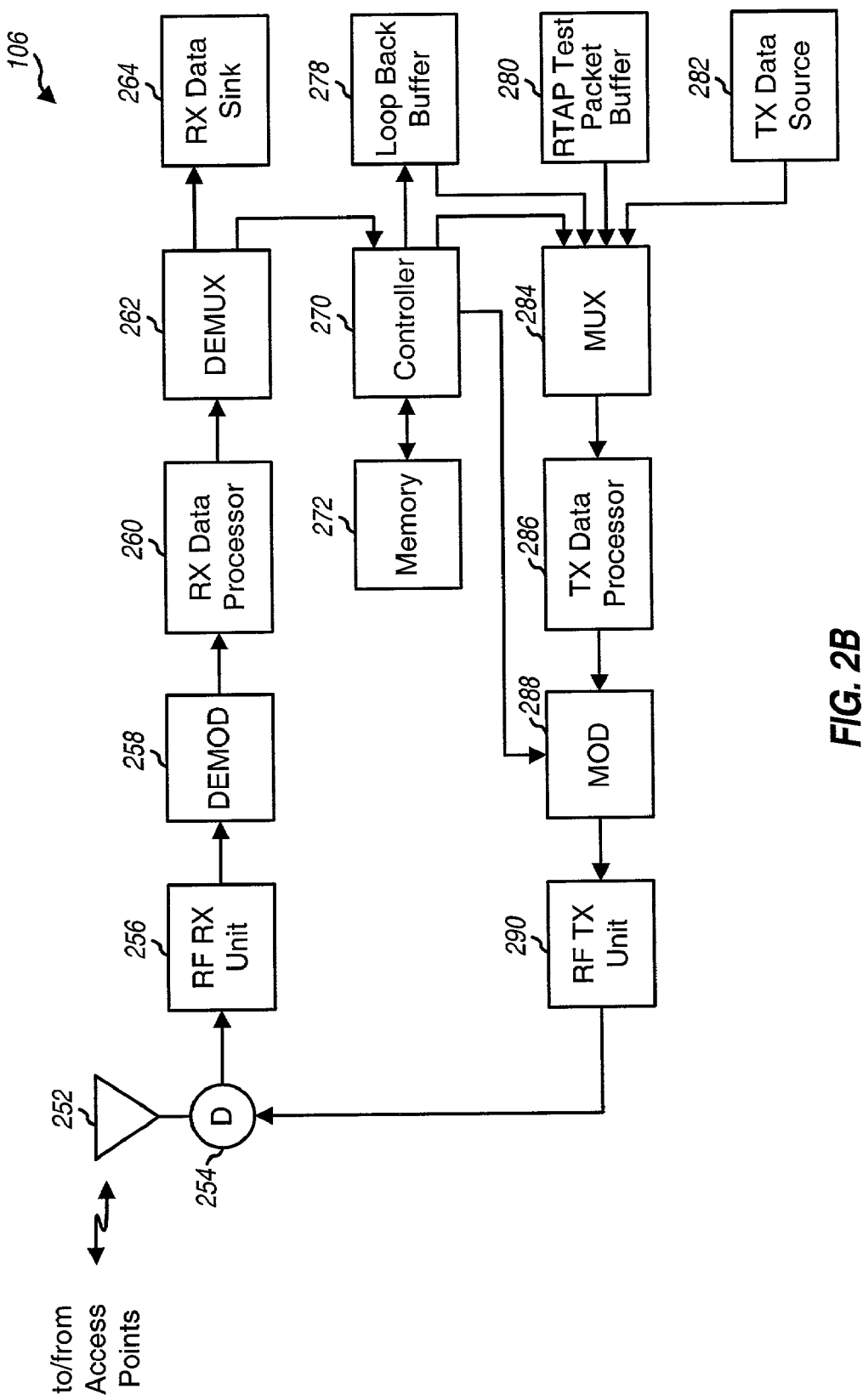

FIG. 2B is a block diagram of an embodiment of terminal 106, which is also capable of supporting various aspects and embodiments of the invention. The forward link signal from the access point is received by an antenna 252, routed through a duplexer 254, and provided to an RF receiver unit 256. RF receiver unit 256 conditions (e.g., filters, amplifies, downconverts, and digitizes) the received signal and provides samples. A demodulator (DEMOD) 258 receives and processes (e.g., despreads, decovers, and demodulates) the samples to provide recovered symbols. Demodulator 258 may implement a rake receiver capable of processing multiple signal instances in the received signal to provide the recovered symbols. A receive (RX) data processor 260 decodes the recovered symbols, checks the received packets, and provides decoded traffic data (via a demultiplexer 262) to a RX data sink 264 and decoded test data to a controller 270. The controller 270 controls the overall test via signaling messages that are sent via a multiplexer (MUX) 284.

On the reverse link, multiplexer 284 receives statistical data of the forward link testing from controller 270, loop back data (described below) from a buffer 278, test data for testing the reverse link from a buffer 280, and traffic data from a TX data source 282. Depending on the operating mode of terminal 106 and the particular test(s) being performed, multiplexer 284 provides the proper combination of various types of data to a TX data processor 286. The provided data is then processed (e.g., formatted, interleaved, and coded) by TX data processor 286, further processed (e.g., covered and spread) by a modulator (MOD) 288, and conditioned (e.g., converted to an analog signal, amplified, filtered, and quadrature modulated) by an RF TX unit 290 to generate a reverse link signal, which is then routed through duplexer 254 and transmitted via antenna 252 to one or more access points 104.

Referring back to FIG. 2A, the reverse link signal is received by antenna 226, routed through duplexer 224, and provided to an RF receiver unit 228. The reverse link signal is conditioned (e.g., downconverted, filtered, and amplified) by RF receiver unit 228, and further processed by a demodulator 232 and an RX data processor 234 in a complementary manner to that performed by modulator 288 and TX data processor 286, respectively, to recover the transmitted data. The reverse link traffic data is provided via a demultiplexer 236 to a RX data sink 238, and the statistical, loop back, and test data is provided to a controller 220 for evaluation.

Aspects of the invention provide techniques to test the performance of terminals and access points in CDMA systems. In an aspect, a framework of protocols and messages is provided to support performance testing of terminals. This framework ensures interface compatibility (e.g., among different equipment vendors). In another aspect, techniques are provided to perform various tests of different types of channels (e.g., traffic channels as well as auxiliary or overhead channels). Tests for bursty data transmissions are supported. In yet another aspect, techniques for collecting, logging, and reporting various statistics are provided, and the collected statistics may thereafter be used to derive various performance metrics such as throughput, packet error rate (PER), and so on. In yet another aspect, techniques are provided to support "persistence" in the testing (i.e., continued testing over connection and disconnection, with the variables used to store statistical information being reset only when instructed). In yet another aspect, techniques are provided to force the settings of certain auxiliary channels (e.g., so that the error rate of the channels may be determined). Various aspects and embodiments of the invention are described in further detail below. For clarity, various aspects of the invention are specifically described for cdma2000 High Rate Packet Data Air Interface (or simply, cdma2000 HAI).

Figure 3:
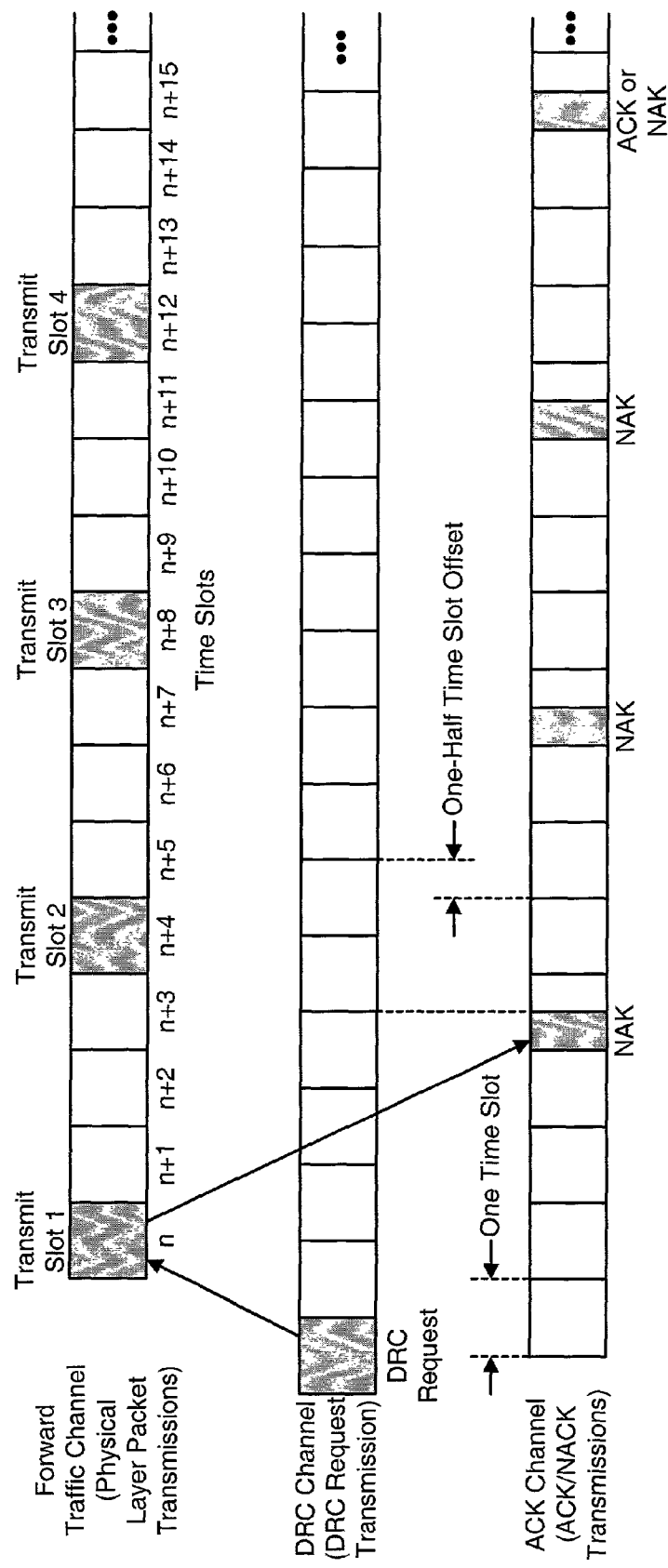
FIG. 3 is a diagram of a transmission scheme used for high rate packet data in cdma2000.

FIG. 3 is a diagram of a forward link transmission scheme used for high rate packet data in cdma2000. Each access point transmits packet data to the terminals that have elected to receive data from the access point, based on signal strength, one at a time, in a time-division multiplexed manner. An access point transmits packet data to a terminal at or near the peak transmit power level, if at all. Whenever a terminal desires a data transmission, it sends a packet data request in the form of a data rate control (DRC) message to a selected access point. The terminal measures the signal quality of the forward link signals (e.g., the pilots) received from a number of access points, determines the access point having the best received signal quality (i.e., the selected access point), identifies the highest data rate supported by the best received link, and sends a DRC value indicative of the identified data rate. The DRC value is transmitted on a DRC Channel and directed to the selected access point via the use of a DRC cover assigned to the access point. The selected access point (or serving sector) schedules data transmission to the terminal on the Forward Traffic Channel according to its scheduling policy that may take into account various factors such as the DRC value received, data in the queue, and so on. Based on the status of the received data transmission, the terminal sends acknowledgments (ACKs) and negative acknowledgments (NACKs) on an ACK Channel to the selected access point. Details of the high rate packet data transmission scheme for cdma2000 is described in 3GPP2 C.S0024, entitled "cdma2000 High Rate Packet Data Air Interface Specification," hereinafter referred to as the HAI Document, and incorporated herein by reference.

The techniques described herein may be used to test various types of channels. For cdma2000 HAI, these channels include the Forward Traffic Channel, the DRC Channel, the ACK Channel, the Reverse Traffic Channel, and possibly others. The Forward Traffic Channel is used for data transmission from the access point to the terminal, and the Reverse Traffic Channel is used for data transmission from the terminal to the access point. The DRC Channel is used to send information regarding the maximum rate to be used for the Forward Traffic Channel, and the ACK Channel is used to send acknowledgment bits for received packets.

The techniques described herein may also be used for various applications. One such application is the testing of terminals in a systematic manner (e.g., in a factory or laboratory environment). The minimum performance for terminals in cdma2000 HAI is described in TIA/EIA/IS-866, entitled "The Recommended Minimum Performance Standards for cdma2000 High Rate Packet Data Terminal," and the minimum performance for access points is described in TIA!EIA/IS-864, entitled "The Recommended Minimum Performance Standards for cdma2000 High Rate Packet Data Access Network," both of which are incorporated herein by reference. Another application is the measurement of certain key forward and/or reverse link performance metrics (e.g., in a field environment) such as throughput and packet error rate (PER).

In an aspect, a framework is provided to enable testing of various elements of a CDMA system (e.g., the cdma2000 HAI system). The framework, which is referred to herein as the "Test Application Protocol" (TAP), comprises a forward test application protocol (FTAP) for testing forward channels and a reverse test application protocol (RTAP) for testing reverse channels.

In an embodiment, the FTAP (1) provides procedures and messages to control the Forward Traffic Channel and to configure reverse channels associated with the Forward Traffic Channel, (2) specifies the generation and transmission of test and loop back packets sent on the Forward and Reverse Traffic Channels, respectively, for the purpose of testing the Forward Traffic Channel, and (3) provides procedures to collect, log, and report certain statistics as observed at the terminal. Fewer, additional, and/or different capabilities may also be supported by the FTAP, and this is within the scope of the invention.

In an embodiment, the RTAP (1) provides procedures and messages to control and configure the reverse traffic channel (RTC), and (2) specifies the generation of test packets sent on the RTC for testing that channel. Fewer, additional, and/or different capabilities may also be supported by the RTAP, and this is within the scope of the invention.

The TAP generates and forwards test packets to the stream layer in the transmit direction, and receives and processes test packets from the stream layer in the receive direction. The transmission unit of the FTAP is an FTAP packet, and the transmission unit of the RTAP is an RTAP packet. The FTAP and RTAP packet sizes are each determined by lower layers negotiated during session configuration. Each FTAP or RTAP packet is included in the stream layer payload.

The FTAP and RTAP each uses signaling messages for controlling and configuring the terminal and the access network for conducting tests on the Forward and Reverse Traffic Channels. The FTAP and RTAP use the Signaling Application described in the aforementioned HAI Document to send messages.

The TAP is registered to receive certain indications from the other layers, which are used to close a test session or change the state of the terminal under test. In an embodiment, the following indications are received by the FTAP and/or RTAP (as shown within the bracket to the right of the indication):

ConnectedState.ConnectionClosed [received by the FTAP and RTAP],
RouteUpdate.IdleHO [received by the FTAP],
RouteUpdate.ConnectionLost [received by the FTAP and RTAP], and
IdleState.ConnectionOpened [received by the FTAP and RTAP].

The TAP also returns the following indication to the higher signaling layers:

LoopbackSyncLost [returned by the FTAP], and
RTAPSyncLost [returned by the RTAP].

Forward Test Application Protocol (FTAP)

The FTAP provides procedures and messages used to configure, control, and perform various tests on the forward channels, including the Forward Traffic Channel. The procedures for the FTAP may be grouped into the following categories:

FTAP Test Parameter Configuration—includes procedures and messages to control FTAP test configurations at the terminal and access network;

FTAP Test Packet Transmission and Reception—includes procedures for generating FTAP Test packets at the access network for transmission on the Forward Traffic Channel, and for processing received packets at the terminal;

FTAP Loop Back Packet Transmission and Reception—includes procedures for sending and receiving FTAP Loop Back packets on the Reverse Traffic Channel;

ACK Channel Transmission—includes procedures for sending configured (fixed-valued) ACK Channel bits on the ACK Channel;

DRC Channel Transmission—includes procedures for sending configured (fixed) DRC values and/or using a fixed DRC cover on the DRC channel; and FTAP Statistics Collection and Retrieval—includes procedures and messages for collecting statistics at the terminal and for retrieving them by the access network.

The procedures and messages are described in further detail below. Fewer, additional, and/or different procedures and messages may also be provided for the FTAP, and this is within the scope of the invention.

The FTAP supports the testing of different types of forward channels. The particular channels to be tested may be individually selected, and the selected channels may be tested concurrently. In an embodiment, the FTAP supports testing of the Forward Traffic Channel, the forward medium access control (MAC) channels, the DRC channel, and the ACK channel. Table 1 lists various modes supported by the FTAP. Fewer, additional, and/or different modes may also be supported, and this is within the scope of the invention.

TABLE 1

| Mode | Description |
| --- | --- |
| Loop Back Mode | enabled to send FTAP Loop Back packets on the Reverse Traffic Channel |
| ACK Channel Bit Fixed Mode | enabled to send fixed-valued ACK Channel bits on the ACK Channel |
| DRC Fixed Mode | enabled to send fixed DRC values on the DRC Channel |
| DRC Cover Fixed Mode | enabled to use fixed Walsh cover on the DRC Channel |

The FTAP supports the collection of certain statistics by the access network, which may be used to determine various performance metrics such as, for example, Forward Link throughput, Traffic Channel packet error rate, Control Channel packet error rate, sector capacity (throughput), and so on. Table 2 lists the statistics that may be collected and maintained by the access network (e.g., for each sector) when the Loop Back mode is enabled.

TABLE 2

| Parameter | Description |
| --- | --- |
| FTAPTestPktSent | the number of FTAP Test packets sent by the access network on the Forward Traffic Channel |
| FTAPTestPktRecd | the number of FTAP Test packets received by the terminal on the Forward Traffic Channel |
| FTAPMACPktRecd | the number of Forward Traffic Channel MAC layer packets received by the terminal in the Physical Layer packets containing FTAP Test packets |
| FTAPLBPktSent | the number of FTAP Loop Back packets sent by the terminal over the Reverse Traffic Channel |
| FTAPLBPktRecd | the number of FTAP Loop Back packets received by the access network over the Reverse Traffic Channel |
| FTAPTestTime | the FTAP test duration (in frames) |
| FTAPPhysPktSlots | the number of slots over which Physical Layer packets containing FTAP Test packets were received by the terminal |

The FTAP supports the collection of certain statistics by the terminal. These statistics may be retrieved by the access network. Table 3 lists the statistics that may be collected and maintained by the terminal.

TABLE 3

| Parameter | Description |
| --- | --- |
| IdleASPChange | the number of changes in the active set pilot in the Idle State |
| IdleTime | the elapsed time (in slots) in the Idle State since the start of statistics collection |
| ConnectedSSChange | the number of changes in the serving sector in the Connected State |
| ConnectedTime | the elapsed time (in slots) in the Connected State since the start of statistics collection |
| FirstSyncCCPkt | the number of first CC MAC Layer packets in synchronous capsules successfully received by the terminal |
| CCTime | the elapsed time (in Control Channel cycles) since the start of statistics collection |

In cdma2000 HAI, a pilot for each sector is characterized by a specific PN offset and a CDMA Channel, and an active set pilot (ASP) is the pilot from the sector whose Control Channel the terminal is currently monitoring. While the terminal is in the Idle State, it monitors the Control Channel from the serving sector. The IdleASPChange is used to collect statistics for the rate of change of the active set pilot, and the FirstSyncCCPkt is used to collect statistics for the number of CC MAC Layer packets in synchronous capsules successfully received by the terminal.

While the terminal is in a Connected State, it may receive packets from serving sectors. A serving sector is the sector to which the DRC message is sent (or pointed at). When the DRC message is re-pointed from one sector to another, the DRC cover transitions through a NULL cover. For example, if the DRC cover changes from sector cover A, through the NULL cover, and to sector cover B (with A not equal to B), then it is counted as one serving sector change. And if the DRC cover changes from sector cover A, through the NULL cover, and back to sector cover A, then it is counted as zero serving sector change. The ConnectedSSChange is used to collect statistics for the rate of change of the serving sector.

The Idle and Connected States are terminal operating states in an Air Link Management Protocol described in the aforementioned HAI Document.

Figure 4:
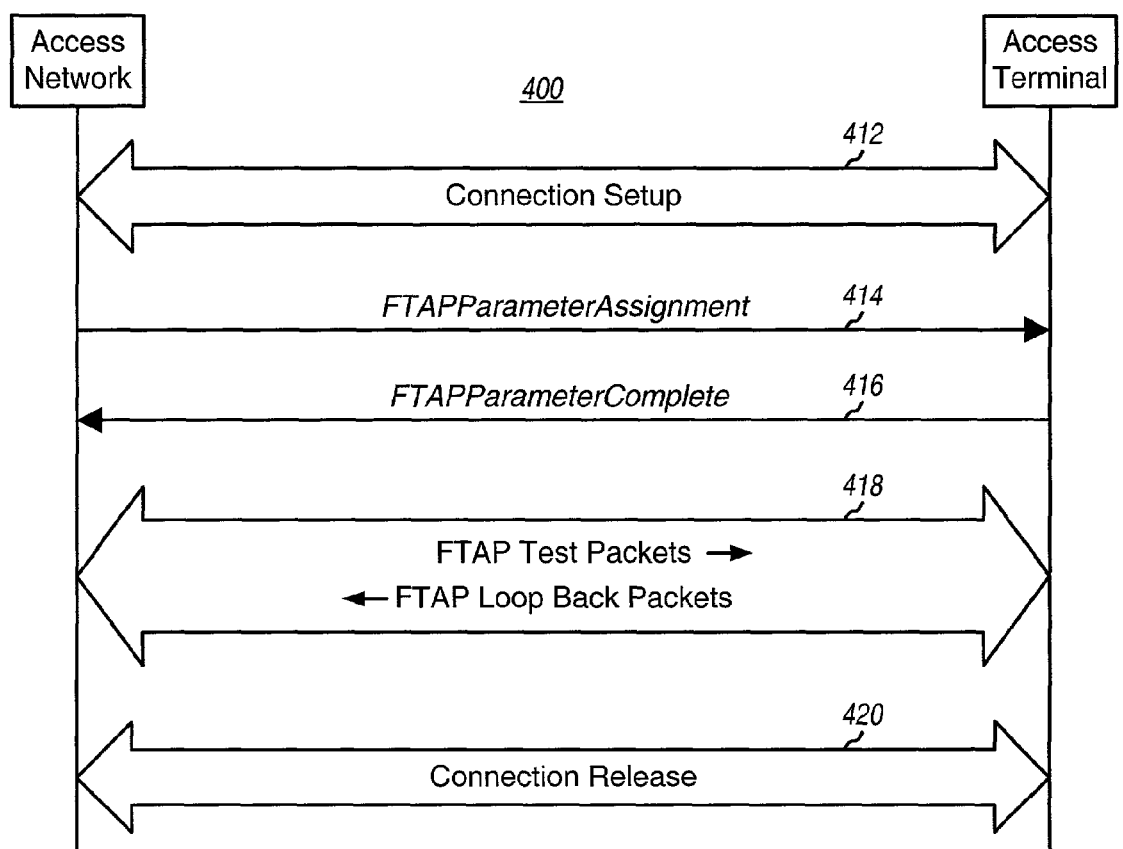
FIG. 4 is a diagram of an embodiment of an overall process for testing a Forward Traffic Channel.

FIG. 4 is a diagram of an overall process 400 for testing the Forward Traffic Channel, in accordance with an embodiment of the invention. Process 400 may be used to determine various performance metrics such as, for example, forward link user throughput, Forward Traffic Channel packet error rate, Control Channel packet error rate, forward link sector throughput, and so on.

Initially, the access network sets up a connection with a terminal in the normal manner, if there is no current connection between them, at step 412. The connection setup for cdma2000 HAI may be performed as described in the aforementioned HAI Document. The access network then sends an FTAPParameterAssignment message to the terminal to configure FTAP, at step 414. The configuration of the terminal for FTAP testing is described below and, in an embodiment, the Loop Back mode is enabled as the default. The terminal performs the necessary configuration and then responds to the access network with an FTPParameterComplete message to indicate that it is ready for the configured tests, at step 416.

The access network and terminal thereafter exchange FTAP Test packets and FTAP Loop Back packets, which are described in further detail below, at step 418. Any number of FTAP packets may be exchanged, and the statistics to be collected by the access network and/or the terminal may be determined by the test configuration.

After sufficient statistics have been collected, the access network stops sending FTAP Test packets and releases the connection, at step 420. Step 420 may be omitted, for example, if the access network proceeds to perform some other tests or functions. The access network may use the statistics it collected to compute the packet error rate and the average throughput, as described below. Various details for process 400 are described below.

In an embodiment, the FTAP is activated by binding the test application to one of three available streams. Protocol configuration can be initiated by the access point or the terminal. In an embodiment, there can be only one instantiation of the FTAP at each terminal.

FTAP Test Parameter Configuration

The access network or the terminal may activate the FTAP to test the forward channels. Upon activation of the FTAP, the terminal performs an FTAP Configuration Initialization procedure, which disables the flags for the Loop Back mode, the ACK Channel Bit Fixed mode, the DRC Fixed mode, and the DRC Cover Fixed mode.

Figure 5:
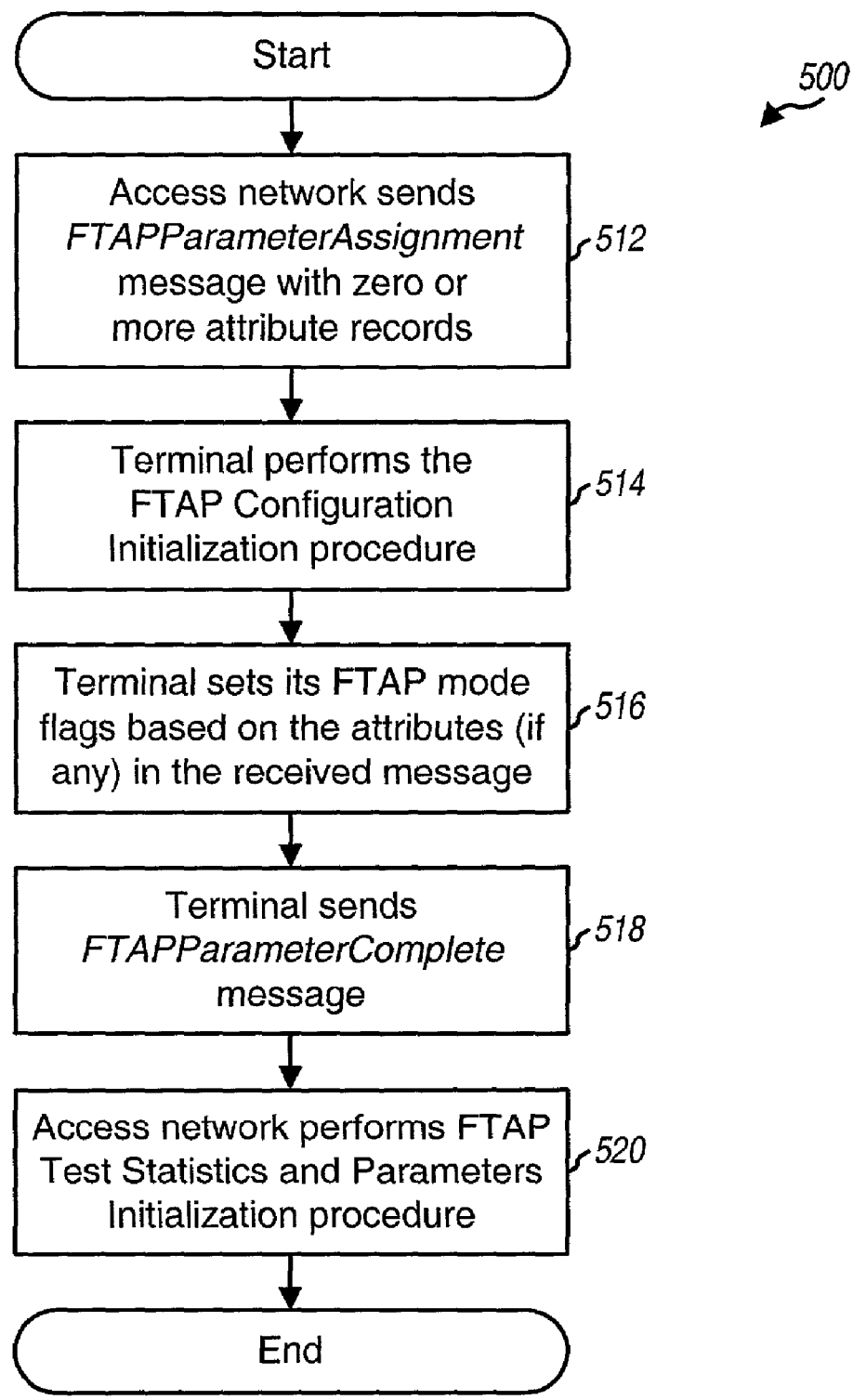
FIG. 5 is a flow diagram of a specific embodiment of an FTAP Test Parameter Configuration process.

FIG. 5 is a flow diagram of a specific embodiment of an FTAP Test Parameter Configuration process 500. Process 500 covers steps 414 and 416 in FIG. 4. To initialize or change test configuration, the access network sends an FTAPParameterAssignment message that includes a particular value for a TransactionID field and may further include one or more attribute records for the FTAP mode flags maintained by the terminal, at step 512. Via the attribute records in the message, the access network is able to control the tests to be performed.

Upon receiving the FTAPParameterAssignment message from the access network, the terminal performs the FTAP Configuration Initialization procedure described above, at step 514. The terminal then sets its FTAP mode flags based on attributes, if any, included in the received message, at step 516. In particular, the received message may include a LoopBackMode attribute, an ACKChBitFixedMode attribute, a DRCFixedMode attribute, and/or a DRCCoverFixedMode attribute.

The LoopbackMode attribute is included in the FTAPParameterAssignment message if the terminal is required to transmit FTAP Loop Back packets on the Reverse Traffic Channel. The ACKChannelBitFixedMode attribute is included if the ACK Channel bits are to be transmitted by the terminal in every slot and are to be set at a particular fixed value. The DRCFixedMode attribute is included if the DRC transmitted by the terminal is to be set to a particular fixed value. And the DRCCoverFixedMode attribute is included if a particular fixed DRC cover is to be used by the terminal for DRC transmission.

If the received message includes the LoopBackMode attribute, then the terminal enables the Loop Back mode flag, stores the value in a LoopBackPersistence field of the attribute, clears the Loop Back buffer, and sets an LBPktOverflowBit to zero. If the received message includes the ACKChannelBitFixedMode attribute, then the terminal enables the ACK Channel Bit Fixed mode flag and stores the value in an ACKChannelBit field of the attribute. If the received message includes the DRCFixedMode attribute, then the terminal enables the DRC Fixed mode flag and stores the value in a DRCValue field of the attribute. And if the received message includes the DRCCoverFixedMode attribute, then the terminal enables the DRC Cover Fixed mode flag and stores the value in a DRCCover field of the attribute.

Upon completion of the test configurations specified by the FTAPParameterAssignment message and within $T_{FTAPConfig}$ (e.g., two) seconds of receiving the message, the terminal sends an FTAPParameterComplete message with the TransactionID field set to the same value as that received in the TransactionID field of the FTAPParameterAssignment message, at step 518. The TransactionID field is used for identifying the specific transaction being referred to by the message.

Upon receiving the FTAPParameterComplete message from the terminal, the access network performs an FTAP Test Statistics and Parameters Initialization procedure, which sets to zero the FTAPTestPktSent, FTAPTestPktRecd, FTAPMACPktRecd, FTAPLBPktSent, FTAPLBPktRecd, FTAPPhysPktSlots, and FTAPTestTime variables maintained for each sector, at step 520. The access network further sets to zero a (14-bit) variable, $V(S_{Test})$, used to track the sequence number of the FTAP Test packets. The FTAP Test Parameter Configuration process then terminates.

The terminal resets its FTAP mode flags upon termination of the FTAP testing. In an embodiment, if the protocol receives a ConnectedState.ConnectionClosed or a Route Update. ConnectionLost indication from the Connection layer, either of which indicates that a connection is terminated, then the terminal disables the flags for the ACK Channel Bit Fixed mode, the DRC Fixed mode, and the DRC Cover Fixed mode. The terminal further disables the Loop Back mode flag if it was previously enabled and if the value of the LoopBackPersistence field of the LoopBackMode attribute in the last FTAPParameterAssignment message was '00'.

Table 4 lists the fields for the FTAPParameterAssignment message, in accordance with a specific embodiment.

TABLE 4

| Field | Length (bits) | Description |
|---|---|---|
| MessageID | 8 | set to '00' by the access network |
| TransactionID | 8 | set to one higher (modulo 256) than the TransactionID field value of the last FTAPParameterAssignment message sent to the terminal |
| | | Zero or more occurrences of the following record: |
| AttributeRecord | Attribute Dependent | the attribute record for LoopbackMode ACKChannelBitFixedMode, DRCFixedMode, or DRCCoverFixedMode; a simple record is defined in section 10.3 of the HAI Document |

Table 5 lists the various fields for the attribute records that may be included in the FTAPParameterAssignment message, in accordance with a specific embodiment. The first column of Table 5 identifies the four different attribute records that may be included in the FTAPParameterAssignment message. Each attribute record includes three fields—Length, Attribute ID, and an attribute dependent data field, and these three fields are shown in the second through fourth column. The Length field gives the length of the attribute record (in octets) excluding the Length field itself. In an embodiment, the length of each attribute record field is 8 bits, and the length of each attribute record is 24 bits.

TABLE 5

| Attribute Record | Length (octets) | Attribute ID | Attribute Data Field and Description |
|---|---|---|---|
| LoopbackMode | 0x02 | 0x03 | LoopBackPersistence - set to '1' if the Loop Back mode is to be maintained by the terminal in the event of a connection closure or a lost connection, and to '0' otherwise |
| ACKChannel-BitFixedMode | 0x02 | 0x02 | ACKChannelBit - the fixed value to be transmitted for the ACK Channel bits by the terminal, which can be set to either '0' or '1' |
| DRCValue-FixedMode | 0x02 | 0x00 | DRCValue - the fixed DRC value to be transmitted by the terminal |
| DRCCover-FixedMode | 0x02 | 0x01 | DRCCover - the fixed DRC cover (i.e., a particular 8-ary Walsh function) to be used by the terminal for the transmission of DRC |

In an embodiment, the FTAPParameterAssignment message is sent on the control channel (CC) and the FTC addressed to the terminal (unicast addressing) with the signaling layer protocol (SLP) set to reliable and the transmission priority set to 40.

Table 6 lists the fields for the FTAPParameterComplete message, in accordance with a specific embodiment.

TABLE 6

| Field | Length (bits) | Description |
|---|---|---|
| MessageID | 8 | set to '01' by the terminal |
| TransactionID | 8 | set to the value of the TransactionID field in the associated FTAPParameterAssignment message |

In an embodiment, the FTAPParameterComplete message is sent on the Reverse Traffic Channel (RTC) addressed to the access network (unicast addressing) with the SLP set to reliable and the transmission priority set to 40.

FTAP Test Packet Transmission and Reception

After the FTAP Test Parameter Configuration is completed and while the terminal is in the Connected State, it monitors the Forward Traffic Channel to receive FTAP Test packets. In an embodiment, the FTAP Test packets are generated by the test application in a normal manner (i.e., similar to a traffic data packet), but each FTAP Test packet includes only the defined fields and no other data. The FTAP Test packets are generated at a sufficient rate to ensure that they are always available for transmission on the Forward Traffic Channel. The FTAP Test packets may be stored in buffer 212 in FIG. 2A.

The access network includes a (14-bit) sequence number, in each transmitted FTAP Test packet, which is used for identification of FTAP Test packets. The sequence number is maintained via a variable, $V(S_{Test})$, by the access network, and is incremented by one after sending an FTAP Test packet.

Table 7 lists the fields for an FTAP Test packet, in accordance with a specific embodiment.

TABLE 7

| Field | Length (bits) | Description |
|---|---|---|
| ProtocolID | 2 | the protocol to which this FTAP Test packet belongs - set to '00' for FTAP packets |
| PacketType | 4 | the packet type within the FTAP - set to 0x0 |
| SEQ | 14 | the sequence number of this FTAP Test packet - set to the value of $V(S_{Test})$ when the packet is generated |
| Reserved | 2 | |

The access network transmits FTAP Test packets on the Forward Traffic Channel in accordance with a set of rules. In an embodiment, the access network assigns a particular transmission priority (e.g., 55) to FTAP Test packets, and further uses the Forced Single Encapsulation feature described in the aforementioned HAI Document.

The terminal receives and processes the FTAP Test packets transmitted on the Forward Traffic Channel. Since these FTAP Test packets were generated in the normal manner at the access point, they can be processed in a normal manner at the terminal, just like the traffic data packets (e.g., demodulated, decoded, and checked to determine whether they were received correctly or in error.

FTAP Loop Back Packet Transmission and Reception

If the Loop Back mode is enabled, then the terminal generates and sends FTAP Loop Back packets on the Reverse Traffic Channel to the access network. The forward and reverse links for cdma2000 HAI are not symmetrical (e.g., the forward link supports a higher rate than the reverse link), and the rate on the reverse link may further be limited (e.g., to as low as 9.6 Kbps in the worse case). The relevant information for the forward link transmission is extracted and looped back to the access network through the loop back packets.

In an embodiment, an FTAP Loop Back packet is generated for each particular time interval (e.g., every 16-slot interval, aligned to the CDMA system time), which is referred to as an "observation" interval. In an embodiment, FTAP Loop Back packets are sent to convey information about the FTAP Test packets received on the Forward Traffic Channel, and the content of each FTAP Loop Back packet is based on, and descriptive of, the FTAP Test packets received over the observation interval. In an embodiment, each FFAP Loop Back packet includes a record for each FTAP Test packet correctly received by the terminal during the associated observation interval. Each record includes various information for the associated FTAP Test packet such as, for example, the serving sector from which the FTAP Test packet was received, the sequence number and length of the FTAP Test packet, and so on. The information in each record included in the FTAP Loop Back packets is used by the access network to derive various forward link performance metrics such as throughput and packet error rate, as described below.

Table 8 lists the fields for an FTAP Loop Back packet, in accordance with a specific embodiment.

TABLE 8

| Field | Length (bits) | Description |
|---|---|---|
| ProtocolID | 2 | the protocol to which this FTAP Loop Back packet belongs - set to '00' for FTAP packets |
| PacketType | 4 | the packet type within the FTAP - set to 0x1 |
| FwdSysTime | 15 | the CDMA system time (in frames mod 32768) corresponding to the start (i.e., the 0-th slot) of the 16-slot observation interval covered by this FTAP Loop Back packet |
| LBPktOverflow | 1 | the flag to indicate if any FTAP Loop Back packets were lost due to buffer overflow - set to the value of the LBPktOverflowBit maintained by the terminal |
| RecordCount | 5 | the number of FTAP Test Packet Records included in this payload; the valid range for this field is 0-16, with 0 indicating no FTAP Test Packet Records |
| RecordCount occurrences of the following record: | | |
| TCAMsgSeq-Included | 1 | set to "1" for the first record; set to '0' for each subsequent record if the TCAMsgSeq value is the same as the previous record and to '1' otherwise |
| TCAMsgSeq | 0 or 8 | the MessageSequence field of the last TrafficChannelAssignment message that assigned the Channel on which the current FTAP Test packet was received; this field is included if the TCAMsgSeqIncluded field is set to 1 and omitted otherwise |
| DRCCover | 3 | the DRC cover associated with the serving sector for the current FTAP Test packet |
| FwdPhysSlots | 4 | the number of slots over which the Physical Layer packet containing the current FTAP Test packet was received |
| FwdMACPkts | 2 | the number of MAC packets received in the Physical Layer packet containing the current FTAP Test packet |
| FwdSeqIncluded | 1 | set to '1' for the first FTAP Test packet record; set to '0' for each subsequent record if the FwdSeq field for the record is one more than the value in the previous record, and to '1' otherwise |
| FwdSeq | 0 or 14 | the value of the SEQ field of the FTAP Test packet associated with the current record; this field is included if the FwdSeqIncluded field is '1' and omitted otherwise |
| Reserved | variable | the length of this field is the smallest value that will make the attribute record aligned to an octet (may be set to zero by the terminal and ignored by the access network) |

The FTAP Loop Back packets are generated in accordance with a set of rules, an embodiment of which is described as follows. For each generated FTAP Loop Back packet, the FwdSysTime field is set to CDMA system time (in frames mod 32768) corresponding to the start (i.e., the 0-th slot) of the 16-slot observation interval. The CDMA system time is effectively used as a sequence number for the FTAP Loop Back packet. The RecordCount field is set to the number of FTAP Test packets received over the associated observation interval. Each record in the FTAP Loop Back packet includes various types of information (as listed in Table 8) for a corresponding FTAP Test packet received during the associated observation interval. The records for the FTAP Test packets are included in ascending order of the SEQ field values in the received FTAP Test packets. An FTAP Loop Back packet is generated even if no FTAP Test packets are received during the 16-slot observation interval.

The generated FTAP Loop Back packets are queued for transmission on the Reverse Traffic Channel, and the terminal provides buffering (e.g., in Loop Back buffer 278 in FIG. 2B) for a particular number of (e.g., eight or more) FTAP Loop Back packets. The LBPktOverflowBit indicates if any FTAP Loop Back packets have been lost due to buffer overflow at the terminal, and is set to '1' if this occurs. When LBPktOverflowBit is set to '1', it indicates that not all the missing FTAP Loop Back packets were lost due to erasures on the Reverse Traffic Channel.

The FTAP Loop Back packets are transmitted in accordance with a set of rules, an embodiment of which is described as follows. FTAP Loop Back packets are assigned a particular transmission priority (e.g., 55). The terminal transmits the queued FTAP Loop Back packets in the Connected State. If the terminal receives a ConnectedState. ConnectionClosed indication for a connection closure or a RouteUpdate.ConnectionLost indication for a lost connection, it does not attempt to establish a connection for transmission of any FTAP Loop Back packets that may have remained in the queue.

The access network receives and processes the FTAP Loop Back packets (in the normal manner, just like other traffic data packets) and further extracts and stores the information included in the received packets.

In an embodiment, the access network maintains two variables, $V(R_{Test})$ and $V(R_{LB})$, to keep track of the received FTAP Test packets received at the access terminal and FTAP Loop Back packets received at the access network. $V(R_{LB})$ is an 15-bit variable representing the sequence number of the next FTAP Loop Back packet expected to be received by the access network, and $V(R_{Test})$ is a 14-bit variable representing the sequence number of the last FFAP Test packet that was successfully received at the terminal. These variables are initialized by the access network upon receiving the first FTAP Loop Back packet following receipt of an FTAPParameterComplete message indicating successful configuration of the Loop Back mode. For the initialization, $V(R_{LB})$ is set to the FwdSysTime field of the first FTAP Loop Back packet, and $V(R_{Test})$ is set to the FwdSeq field of the first FTAP Test Packet Record in the first FTAP Loop Back packet.

In an embodiment, the access network processes each received FTAP Loop Back packet based on the following procedure and using the value of the FwdSysTime field in the received packet:

If FwdSysTime >V(RLB), then
  FTAPLBPktSent is incremented by {FwdSysTime−V($R_{LB}$)+1},
  FTAPLBPktRecd is incremented by 1,
  FTAPTestTime is incremented by {FwdSysTime−V($R_{LB}$)+1}, and
  $V(R_{LB})$ is set to FwdSysTime +1.
If FwdSysTime<V($R_{LB}$), then generate a LoopBackSyncLost indication.

Since one FTAP Loop Back packet is expected to be transmitted by the terminal for each 16-slot observation interval (i.e., each frame), the FwdSysTime included in each FTAP Loop Back packet may be used as the sequence number for the packet. For each received FTAP Loop Back packet, the number of FTAP Loop Back packets sent by the terminal since the last received FTAP Loop Back packet may be determined based on the sequence number of the current received packet, FwdSysTime, and the sequence number of the expected packet, $V(R_{LB})$. The sequence number of the next FTAP Loop Back packet expected to be received is obtained by incrementing the sequence number of the current received packet by one.

In an embodiment, the access network further sequentially processes the records in each received FTAP Loop Back packet based on the following procedure. First, the serving sector that transmits the FTAP Test packet to the terminal is determined based on the TCAMsgSeqIncluded, TCAMsgSeq, and DRCCover fields included in the FTAP Loop Back packet. The statistical variables maintained for this serving sector are then updated as follows:

FTAPPhysPktSlots is increment by the FwdPhysSlots field in the record,
FTAPMACPktRecd is increment by the FwdMACPkts field in the record,
FTAPTestPktSent is increment by {FwdSeq−V($R_{Test}$)+1}, and
$V(R_{Test})$ is set to {FwdSeq+1}.

In an embodiment, operations and comparisons performed on sequence numbers are carried out in unsigned modulo $2^S$ arithmetic, where S denotes the number of bits used to represent the sequence number. For a sequence number of x, the numbers in the range of $[x+1, x+2^{S-1}-1]$ are considered to be greater than x and the numbers in the range of $[x-1, x-2^{S-1}]$ are considered to be smaller than x.

DRC Channel Transmission

If the DRC Fixed mode is enabled, then the terminal transmits the DRC value specified by the DRCFixedMode attribute in the FTAPParameterAssignment message. And if the DRC Cover Fixed mode is enabled, then the terminal uses the DRC cover specified by the DRCCoverFixedMode attribute in the message. Otherwise, the terminal transmits the DRC in the normal manner.

ACK Channel Transmission

If the ACK Channel Bit Fixed mode is enabled, then the terminal transmits the ACK Channel bit value, specified by the ACKChannelBitFixedMode attribute in the FTAPParameterAssignment message, on the ACK Channel in all slots. In an embodiment, the terminal further processes the received FTAP Test packets in accordance with the specified ACK Channel bit value.

If the ACK Channel Bit value is specified as '0', then the terminal receives packets on the Forward Traffic Channel as if they are of one slot duration. The terminal stops receiving a packet after one slot even if the packet has not been successfully decoded in a single slot and its full-length may be greater than one slot.

If the ACK Channel Bit value is specified as '1', then the terminal receives packets on the Forward Traffic Channel as if they are of full-length duration. The terminal continues receiving a packet till the full-length (in slots) has elapsed even if the packet was successfully decoded before its full-length has elapsed.

In either case (i.e., whether the ACK Channel Bit value is a '0' or a '1'), the terminal continues to generate and transmit FTAP Loop Back packets, if the Loop Back mode is enabled.

Terminal Statistics Collection and Retrieval

In an aspect, procedures and messages are provided to facilitate the collection, logging, and reporting of statistical information by the terminal. When the protocol is instantiated, the terminal performs an FTAP Statistics Initialization procedure, which sets to zeros the IdleASPChange, IdleTime, ConnectedSSChange, ConnectedTime, FirstSyncCCPkt, and CCTime variables maintained by the terminal.

Figure 6:
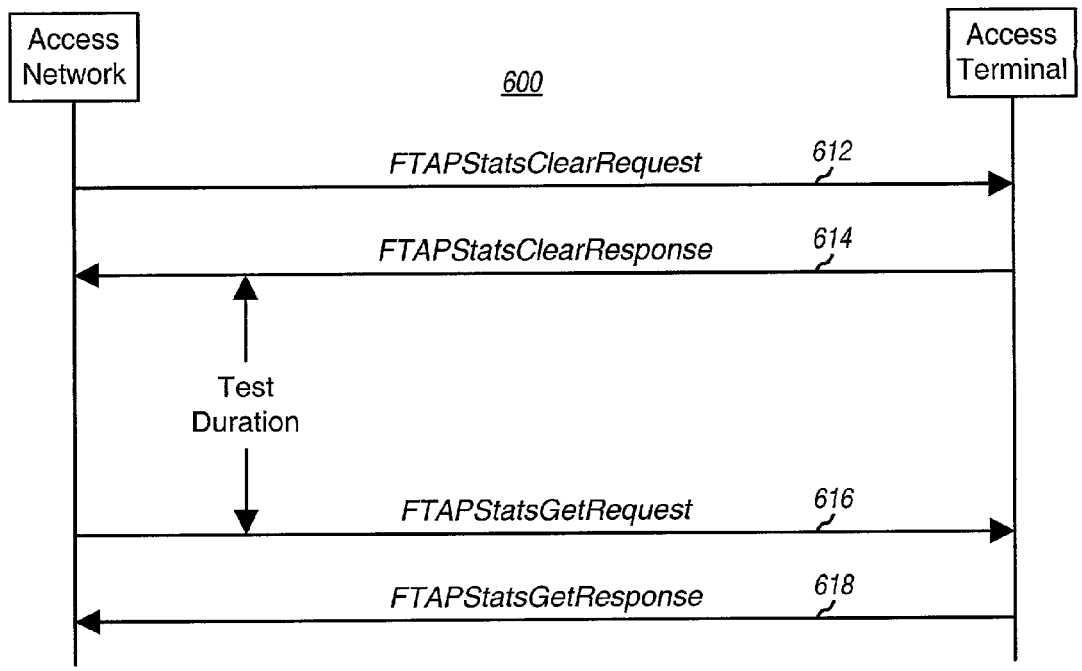
FIG. 6 is a diagram of an embodiment of a process for retrieving statistical information from the terminal.

FIG. 6 is a diagram of a process 600 for retrieving statistical information from the terminal, in accordance with an embodiment of the invention. Process 600 may be performed at any time during a test.

Initially, the access network sends an FTAPStatsClearRequest message to direct the terminal to clear the statistics collected at the terminal, at step 612. Upon receiving the message, terminal performs the FTAP Statistics Initialization procedure, clears the variables maintained for the requested statistics, and then responds with the FTAPStatsClearResponse message, at step 614. The access network can reset the variables at the terminal at any time by sending the FTAPStatsClearRequest message. Reception of an FTAPStatsClearResponse message from the terminal containing the same TransactionID value as that of the FTAPStatsClearRequest message indicates that the statistical variables at the terminal have been cleared.

Testing is then performed based on the FTAP test configuration described above. After sufficient time has elapsed, the access network may send an FTAPStatsGetRequest message to retrieve the statistics collected at the terminal, at step 616.

Upon receiving the message, the terminal responds with an FTAPStatsGetResponse message containing the same TransactionID value as that of the corresponding FTAPStatsGetRequest message and the requested statistics, at step 618. As shown in FIG. 6, the time period between the FTAPStatsClearResponse and FTAPStatsGetRequest messages constitutes the test duration over which statistics are collected by the terminal.

In an aspect, statistics may be collected for each of a number of terminal operating states such as the Idle State and the Connected State. In an embodiment, while the Air Link Management Protocol is in a particular state (e.g., the Idle State or Connected State), the statistics collection for that state is enabled and the statistics collection for all other states is disabled. In an embodiment, with the Idle State statistics collection enabled while in the Idle State, the IdleASPChange is incremented whenever a RouteUpdate.IdleHO indication is received and the IdleTime is incremented for every slot. And with the Connected State statistics collection enabled while in the Connected State, the ConnectedSSChange is incremented whenever there is a change in the serving sector and the ConnectedTime is incremented for every slot.

In an embodiment, Control Channel statistics collection is enabled when in the Idle or Connected State. While the Control Channel statistics collection is enabled, the FirstSyncCCPkt is incremented whenever the first CC MAC Layer packet in a synchronous capsule is successfully received by the terminal and the CCTime is incremented at the beginning of every Control Channel cycle.

Table 9 lists the fields for the four messages used for statistics retrieval, in accordance with a specific embodiment. Each message includes a MessageID field used to identify the message type and a TransactionID field used to identify the transaction. The FTAPStatsClearRequest and FTAPStatsGetResponse messages each further includes one or more AttributeID records, with each record including the AttributeID for the IdleASPStats, ConnectedSSStats, or FirstSyncCCPktStats attribute (described below). The FTAPStatsGetResponse message further includes one or more AttributeRecord record, with each record being a simple record for the IdleASPStats attribute, the ConnectedSSStats attribute, or the FirstSyncCCPktStats attribute described in Table 10 through Table 12. The MessageID, TransactionID, and AttributeID fields are each 8 bits in length, and each AttributeRecord record has a length described below.

TABLE 9

| Message | Message ID | TransactionID | Additional Records |
|---|---|---|---|
| FTAPStats-ClearRequest | 0x02 | set to one higher (modulo 256) than the TransactionID field value of the last FTAPStatsClearRequest message sent to this terminal | one or more AttributeID records |
| FTAPStats-ClearResponse | 0x03 | set to the TransactionID field value of the corresponding FTAPStatsClearRequest message | none |
| FTAPStats-GetResponse | 0x04 | set to one higher (modulo 256) than the TransactionID field value of the last FTAPStatsGetRequest message sent to this terminal | one or more AttributeID records |
| FTAPStats-GetResponse | 0x05 | set to the TransactionID field value of the corresponding FTAPStatsGetRequest message | one or more AttributeRecord records |

Table 10 lists the fields for the IdleASPStats attribute record, which may be included in the FTAPStatsGetResponse message. This attribute record provides the statistics for changes in the active sector pilot, as collected by the terminal.

TABLE 10

| Field | Length (bits) | Description |
|---|---|---|
| Length | 8 | the length of the attribute record (in octet) excluding the Length field; set to 0x06 by the terminal |
| AttributeID | 8 | set to 0x04 by the terminal |
| IdleASP-ChangeOverflow | 1 | set to '1' if the value of the IdleASPChange statistics exceeds $2^{15} - 1$, and to '0' otherwise |
| IdleASPChange | 15 | the value of the IdleASPChange statistics mod $2^{15}$ |
| IdleTimeOverflow | 1 | set to '1' if the value of the IdleTime statistics exceeds $2^{23} - 1$, and to '0' otherwise |
| IdleTime | 23 | the value of the IdleTime statistics mod $2^{23}$ |

Table 11 lists the fields for the ConnectedSSStats attribute record, which may be also included in the FTAPStatsGetResponse message. This attribute record provides the statistics for changes in the serving sector, as collected by the terminal.

TABLE 11

| Field | Length (bits) | Description |
|---|---|---|
| Length | 8 | the length of the attribute record (in octet) excluding the Length field; set to 0x06 by the terminal |
| AttributeID | 8 | set to 0x05 by the terminal |

TABLE 11-continued

| Field | Length (bits) | Description |
|---|---|---|
| ConnectedSS-ChangeOverflow | 1 | set to '1' if the value of the ConnectedSSChange statistics exceeds $2^{15} - 1$, and to '0' otherwise |
| ConnectedSSChange | 15 | the value of the ConnectedSSChange statistics mod $2^{15}$ |
| Connected-TimeOverflow | 1 | set to '1' if the value of the ConnectedTime statistics exceeds $2^{23} - 1$, and to '0' otherwise |
| ConnectedTime | 23 | the value of the ConnectedTime statistics mod $2^{23}$ |

Table 12 lists the fields for the FirstSyncCCPktStats attribute record, which may be also included in the FTAP-StatsGetResponse message. This attribute record provides the statistics for the first synchronous CC packet, as collected by the terminal.

TABLE 12

| Field | Length (bits) | Description |
|---|---|---|
| Length | 8 | the length of the attribute record (in octet) excluding the Length field; set to 0x06 by the terminal |
| AttributeID | 8 | set to 0x06 by the terminal |
| FirstSyncCC-PktOverflow | 1 | set to '1' if the value of the FirstSyncCCPkt statistics exceeds $2^{15} - 1$, and to '0' otherwise |
| FirstSyncCCPkt | 15 | the value of the FirstSyncCCPkt statistics mod $2^{15}$ |
| CCTimeOverflow | 1 | set to '1' if the value of the CCTime statistics exceeds $2^{15} - 1$, and to '0' otherwise |
| CCTime | 15 | the value of the CCTime statistics mod $2^{15}$ |

Table 13 lists the channels used for transmitting the four messages, the address mode, and SLP transmission scheme, and the transmission priority.

TABLE 13

| Message | Channels | Addressing | SLP | Priority |
|---|---|---|---|---|
| FTAPStatsClearRequest | CC FTC | unicast | best effort | 40 |
| FTAPStatsClearResponse | RTC | unicast | best effort | 40 |
| FTAPStatsGetResponse | CC FTC | unicast | reliable | 40 |
| FTAPStatsGetResponse | RTC | unicast | reliable | 40 |

The forward link performance may be determined based on the statistics collected at the terminal and reported to the access network. Some of the performance computations are described below.

Idle State $ASP$ Change Rate(per second) =

Idle $ASP$ Change $\times 1000/(IdleTime \times 5/3)$.

Connected State Serving Sector Change Rate(per second) =

Connected $SS$ Change $\times 1000/(ConnectedTime \times 5/3)$.

Control Channel packet error rate in the Idle State(%) =

$(1 - FirstSync\ CC\ Pkt/CC\ Time) \times 100$.

Throughput from a sector(Kbps) =

$FTAPMACPktRecd \times 1024/(FTAPTestTime \times 16 \times 5/3)$.

Throughput from all sectors(Kbps) =

$\sum_{All\ Sectors}$ Throughput from a sector(Kbps).

Throughput over transmitted slots from a sector(Kbps) =

$FTAPMACPktRecd$ for the sector $\times 1024/$ $(FTAPPhysPktSlots$ for the sector $\times 5/3)$ Throughput over transmitted slots from all sectors(Kbps) =

$\sum_{All\ Sectors}$ Throughput over transmitted slots from a sector(Kbps)

Forward link PER(%) =

$\left(1 - \sum_{All\ Sectors} FTAPTestPktRecd \bigg/ \sum_{All\ Sectors} FTAPTestPktSent\right) \times 100$ Reverse link quality over the test duration for a sector(%) =

$(1 - FTAPLBPktRecd/FTAPLBPktSent) \times 100$

Overall reverse link quality over the test duration(%) =

$\left(1 - \sum_{All\ Sectors} FTAPLBPktRecd \bigg/ \sum_{All\ Sectors} FTAPLBPktSent\right) \times 100$ The ratio of 5/3 in the above equations corresponds to the 1.667 msec for each time slot in cdma2000. Other performance metrics may also be derived based on other statistics that may be logged at the access network. For example, the DRC values received from the terminals may be logged to determine the DRC Symbol error performance on the DRC Channel.

Referring back to FIG. 2B, at terminal 106, RX data processor 260 may be operated to process the FTAP Test packets and to forward the packets via demultiplexer 262 to controller 270. Controller 270 then identifies and extracts various types of information from each received FTAP Test packet (e.g., the serving sector, the sequence number, and the length of each FTAP Test packet). Controller 270 then forms the FTAP Loop Back packets having the pertinent information as described above. The FTAP Loop Back packets may be stored in Loop Back buffer 278. At the appropriate time, the FTAP Loop Back packets are retrieved from buffer 278, routed through multiplexer 284, and processed by TX data processor 286 for transmission over the Reverse Traffic Channel.

Referring back to FIG. 2A, at access point 104, the FTAP Loop Back packets are processed by RX data processor 234 and provided to controller 220. Controller 220 then identifies and extracts various types of information from each received FTAP Loop Back packet (e.g., the serving sector, the sequence number, and the length of each covered FTAP Test packet). Controller 220 further updates the variables maintained for each serving sector based on the information extracted from the received FTAP Loop Back packets, as described above. Controller 220 may further be operated to perform the computations described above for the various forward link performance metrics. Other forward link performance metrics may be derived based on other statistics that may be logged at the access terminal. For example, by logging the received FTAP Test packets, Forward Traffic Channel Packet Miss probability, Packet Reception False Alarm probability, and so on, can be determined.

Reverse Test Application Protocol (RTAP)

The RTAP provides the procedures and messages used to configure, control, and perform various tests of the reverse channels, including the Reverse Traffic Channel. The procedures for the RTAP may be grouped into the following categories:

Test Parameter Configuration—includes procedures and messages to control RTAP test configurations at the terminal and access network; and RTAP Test Packet Transmission and Reception—includes procedures for generating RTAP Test packets and RTAP Fill packets at the terminal, transmitting the generated packets at configured rates on the Reverse Traffic Channel, and processing the received packets at the access network.

The procedures and messages are described in further detail below. Fewer, additional, and/or different procedures and messages may also be provided for the RTAP, and this is within the scope of the invention.

The RTAP supports the testing of the Reverse Traffic Channel at various rates. Table 14 lists various modes supported by the Reverse Traffic Channel.

TABLE 14

| Mode | Description |
| --- | --- |
| RTAP Test Packet Mode | enabled to test the Reverse Traffic Channel |
| Configured Packet Rate Mode | enabled to test the Reverse Traffic Channel at various rates |

The RTAP supports the collection of certain statistics by the access network, which may be used to determine various performance metrics such as throughput and packet error rate. Table 15 lists the statistics that may be collected and maintained by the access network.

TABLE 15

| Parameter | Description |
| --- | --- |
| RTAPTestPktSent[i] | an array whose i-th element contains the number of RTAP Test packets that were sent by the terminal at a rate corresponding to RateIndex i shown in Table 18 |
| RTAPTestPktRecd[i] | an array whose i-th element contains the number of RTAP Test packets that were received by the access network at a rate corresponding to RateIndex i |
| RTAPTestTime | the duration of the RTAP test (in frames) |

Figure 7:
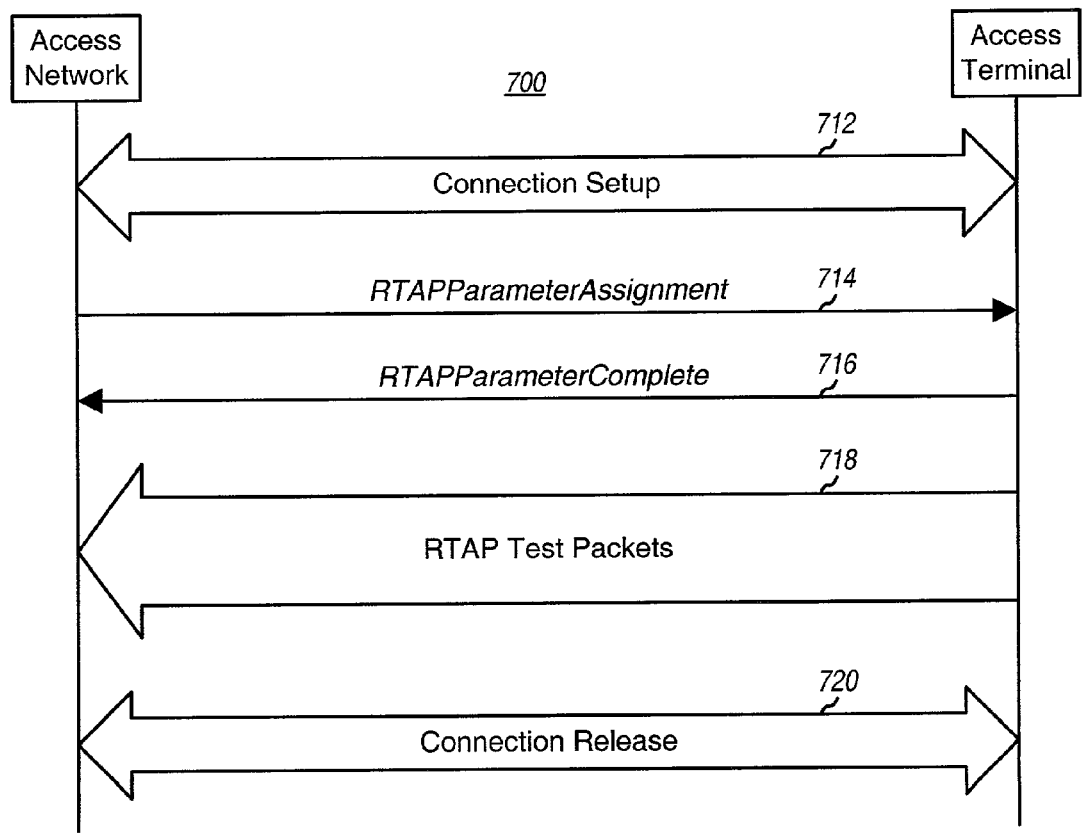
FIG. 7 is a diagram of an embodiment of an overall process for testing a Reverse Traffic Channel.

FIG. 7 is a diagram of an overall process 700 for testing the Reverse Traffic Channel, in accordance with an embodiment of the invention. Process 700 may be used for various tests such as, for example, reverse link throughput, packet error rate, and so on.

Initially, the access network sets up a connection with the terminal in the normal manner, if there is no current connection between them, at step 712. The access network then sends an RTAPParameterAssignment message to the terminal to configure RTAP, at step 714. The message includes an RTAPTestPktEnable attribute record to enable transmission of RTAP Test packets by the access terminal. The terminal performs the necessary configuration and then responds to the access network with an RTPParameterComplete message to indicate that it is ready for the configured tests, at step 716.

The terminal thereafter sends RTAP Test packets to the access network, at step 718. Any number of packets may be sent, and the statistics to be collected by the access network and/or terminal may be determined by the test configuration.

After sufficient statistics have been collected, the access network releases the connection, at step 720. Step 720 may be omitted, for example, if the access network proceeds to perform some other tests or functions. The access network may use the statistics it collected to compute the packet error rate and the throughput, as described below. Various details for process 700 are described below.

RTAP Test Parameter Configuration

The access network or the terminal may activate the RTAP to test the reverse channels. Upon activation of the RTAP, the terminal performs an RTAP Configuration Initialization procedure, which disables the flags for the RTAP Test Packet mode and the Configured Packet Rate mode.

Figure 8:
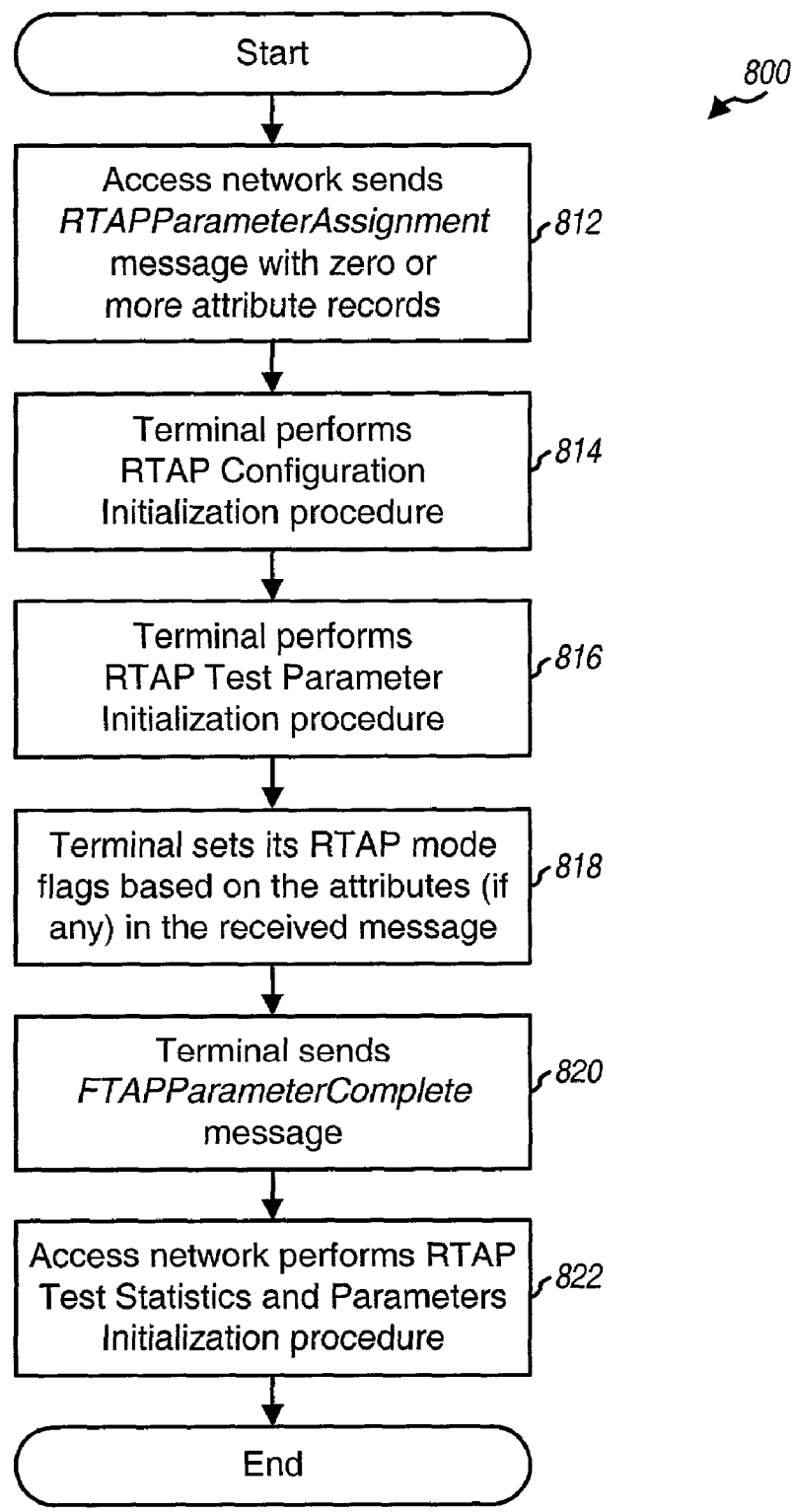
FIG. 8 is a flow diagram of a specific embodiment of an RTAP Test Parameter Configuration process.

FIG. 8 is a flow diagram of a specific embodiment of an RTAP Test Parameter Configuration process 800. Process 800 covers steps 714 and 716 in FIG. 7. To initialize or change RTAP test configuration, the access network sends an RTAPParameterAssignment message that includes a particular value for the TransactionID field and may further include one or more attribute records for the RTAP mode flags maintained by the terminal, at step 812. Via the attribute records in the message, the access network is able to control the tests to be performed.

Upon receiving the RTAPParameterAssignment message from the access network, the terminal performs the RTAP Configuration Initialization procedure described above, at step 814. The terminal then performs an RTAP Test Parameter Initialization procedure, at step 816. In an embodiment, this procedure sets to zero a (12-bit) variable, $V_i(S_{Rev})$, used to track the sequence number of the RTAP Test packets transmitted at the rate corresponding to RateIndex i (shown in Table 18), for all possible Reverse Traffic Channel rates (i.e., for all possible value of i).

The terminal also sets its RTAP mode flags based on the attributes, if any, included in the received message, at step 818. In particular, the received message may include an RTAPTestPktEnable attribute and/or a PacketRateMode attribute. The RTAPTestPktEnable attribute is included if the terminal is to start sending RTAP Test packets on the Reverse Traffic Channel, and the PacketRateMode attribute is included if the Reverse Traffic Channel rate is to be configured.

If the received message includes the RTAPTestPktEnable attribute, then the RTAP Test Packet mode is enabled, the value of the RTAPTestPktPersistence field in the attribute is stored, the RTAP Test Packet buffer (e.g., buffer 280 in FIG. 2B) is cleared, and a TestPktOverflowBit is set to zero. And if the received message includes the PacketRateMode attribute, then the Configured Packet Rate mode is enabled and the values of the MinRate and MaxRate fields in the attribute are stored.

Upon completion of the RTAP test configurations specified by the RTAPParameterAssignment message and within $T_{RTAPConfig}$ (e.g., two) seconds of receiving the message, the terminal sends an RTAPParameterComplete message with the TransactionID field set to the same value as that received in the corresponding RTAPParameterAssignment message, at step 820.

Upon receiving the RTAPParameterComplete message from the terminal, the access network performs an RTAP Test Statistics and Parameters Initialization procedure, which resets RTAPTestPktSent[i], RTAPTestPktRecd[i], and RTAPTestTime to zeros (for all possible values of i), at step 822.

The terminal also resets its RTAP mode flags upon termination of the RTAP testing. In an embodiment, if the RTAP receives a ConnectedState.ConnectionClosed or a RouteUpdate.ConnectionLost indication from the upper signaling layer, then the Configured Packet Rate mode is disabled and the RTAP Test Packet mode is also disabled if it was previously enabled and if the value of the RTAPTestPktPersistence field of the RTAPTestPktEnable attribute in the last received RTAPParameterAssignment message was '00'.

Table 16 lists the fields for the RTAPParameterAssignment message, in accordance with a specific embodiment.

TABLE 16

| Field | Length (bits) | Description |
| --- | --- | --- |
| MessageID | 8 | set to 0x80 by the access network |
| TransactionID | 8 | set to one higher (modulo 256) than the TransactionID field value of the last RTAPParameterAssignment message sent to the terminal |
| Zero or more occurrences of the following record: | | |
| AttributeRecord | Attribute Dependent | attribute record for RTAPTestPktEnable or PacketRateMode; a simple record defined in section 10.3 of the HAI Document |

Table 17 lists the various fields for the attribute records that may be included in the RTAPParameterAssignment message, in accordance with a specific embodiment. The first column of Table 17 identifies the two different attribute records that may be included in the RTAPParameterAssignment message. The RTAPTestPktEnable attribute record includes three fields—Length, Attribute ID, and RTAPTestPktPersistence. The PacketRateMode attribute record includes four fields—Length, Attribute ID, MinRate, and MaxRate. The Length field gives the length of the attribute record (in octets) excluding the Length field itself, which is two octets. Thus, the length of the RTAPTestPktEnable attribute record is 6 octets or 24 bits, and the length of the RTAPTestPktEnable attribute record is 8 octets or 32 bits.

TABLE 17

| Attribute Record | Length (octets) | Attribute ID | Attribute Data Field(s) and Description |
| --- | --- | --- | --- |
| RTAPTestPktEnable | 0x02 | 0x00 | RTAPTestPktPersistence - set to 0x01 if the RTAP Test Packet Enable mode is to be maintained in the event of a connection closure or a lost connection, and to 0x00 otherwise |
| PacketRateMode | 0x03 | 0x01 | MinRate - set to the RateIndex corresponding to the minimum rate that the terminal can use to transmit RTAP Test packets (default = 0x00); |

TABLE 17-continued

| Attribute Record | Length (octets) | Attribute ID | Attribute Data Field(s) and Description |
| --- | --- | --- | --- |
| | | | MaxRate - set to the RateIndex corresponding to the maximum rate that the terminal can use to transmit RTAP Test packets (default = 0x05) |

Table 18 lists the mapping of the RateIndex values to the Reverse Traffic Channel rates.

TABLE 18

| RateIndex | Reverse Traffic Channel (RTC) Rate |
| --- | --- |
| 0 | 0 Kbps |
| 1 | 9.6 Kbps |
| 2 | 19.2 Kbps |
| 3 | 38.4 Kbps |
| 4 | 76.8 Kbps |
| 5 | 153.6 Kbps |
| all other values | invalid |

In an embodiment, the RTAPParameterAssignment message is sent on the Control Channel and the Forward Traffic Channel addressed to the terminal with the SLP set to reliable and the transmission priority set to 40.

Table 19 lists the fields for the RTAPParameterComplete message, in accordance with a specific embodiment.

TABLE 19

| Field | Length (bits) | Description |
| --- | --- | --- |
| MessageID | 8 | set to 0x81 by the terminal |
| TransactionID | 8 | set to the value of the TransactionID field in the corresponding RTAPParameterAssignment message |

In an embodiment, the RTAPParameterComplete message is sent on the Reverse Traffic Channel addressed to the access network (unicast addressing) with the SLP set to reliable and the transmission priority set to 40.

RTAP Packet Transmission and Reception

If the RTAP Test Packet mode is enabled, then the terminal generates and sends RTAP Test packets on the Reverse Traffic Channel to the access network. In an embodiment, an RTAP Test packet is generated for each particular time interval (e.g., every 16-slot interval, aligned to the CDMA system time). In an embodiment, the RTAP Test packets include information that covers RTC Physical Layer packets transmitted up to, but not including, the time instant of generation.

Table 20 lists the fields for an RTAP Test packet, in accordance with a specific embodiment.

TABLE 20

| Field | Length (bits) | Description |
|---|---|---|
| ProtocolID | 2 | the protocol to which this packet belongs - set to '01' for RTAP packets |
| PacketType | 4 | the packet type within the RTAP - set to 0x0 |
| RevSysTime | 8 | the CDMA system time (in frames mod 256) corresponding to the slot boundary when the RTAP Test packet was generated |
| RTAPTestPkt-Overflow | 1 | flag to indicate if any RTAP Test packets were lost due to buffer overflow at the terminal - set to the value of the RTAPTestPktOverflowBit |
| Seq_0 | 12 | the sequence number of the last RTAP Test packet transmitted at a rate of 0 Kbps prior to the generation of this RTAP Test packet |
| Seq_1 | 12 | the sequence number of the last RTAP Test packet transmitted at a rate of 9.6 Kbps prior to the generation of this RTAP Test packet |
| Seq_2 | 12 | the sequence number of the last RTAP Test packet transmitted at a rate of 19.2 Kbps prior to the generation of this RTAP Test packet |
| Seq_3 | 12 | the sequence number of the last RTAP Test packet transmitted at a rate of 38.4 Kbps prior to the generation of this RTAP Test packet |
| Seq_4 | 12 | the sequence number of the last RTAP Test packet transmitted at a rate of 76.8 Kbps prior to the generation of this RTAP Test packet |
| Seq_5 | 12 | the sequence number of the last RTAP Test packet transmitted at a rate of 153.6 Kbps prior to the generation of this RTAP Test packet |
| Reserved | 7 | (may be set to zero by the terminal and ignored by the access network) |

Since one RTAP Test packet is expected to be transmitted by the terminal for each frame, the RevSysTime included in each RTAP Test packet may be used as the sequence number for the packet.

If the Configured Packet Rate mode is enabled, the terminal transmits a (variable length) RTAP Fill packet of the size necessary to fill up the Reverse Traffic Channel packet containing the RTAP Test packet at the selected rate. Table 21 lists the fields for an FTAP Fill packet, in accordance with a specific embodiment.

TABLE 21

| Field | Length (bits) | Description |
|---|---|---|
| ProtocolID | 2 | the protocol to which this packet belongs - set to '01' for RTAP packets |
| PacketType | 4 | the packet type within the RTAP - set to 0x1 |
| DataFill | variable | (may be set to zero by the terminal and ignored by the access network) |

The generated RTAP Test packets are queued for transmission on the Reverse Traffic Channel, and the terminal provides buffering (e.g., in buffer 280 in FIG. 2B) for a particular number of (e.g., eight or more) RTAP Test packets. The RTAPTestPktOverflowBit indicates if any RTAP Test packets have been lost due to buffer overflow, and is set to '1' if this occurs.

The RTAP Test packets are transmitted in accordance with a set of rules, an embodiment of which is described as follows. RTAP Test packets are assigned a particular transmission priority (e.g., 55), and the RTAP Fill packets (if any) are also assigned another particular transmission priority (e.g., 255). The terminal transmits the queued RTAP Test packets and RTAP Fill packets (if any) in the Connected State.

In an embodiment, the RTAP Test packets are transmitted at rates determined based on a defined rate selection scheme. If the Configured Packet Rate mode is enabled, then the terminal selects a Reverse Traffic Channel rate in accordance with a set of rules, an embodiment of which is described below. Otherwise, the terminal selects a rate in accordance with a Reverse Traffic Channel MAC Protocol described in the aforementioned HAI Document.

TABLE 22

| Parameter | Description |
|---|---|
| MinRate | the value of the MinRate field in the PackerRateMode attribute of the received RTAPParameterAssignment message |
| MaxRate | the value of the MaxRate field in the PackerRateMode attribute of the received RTAPParameterAssignment message |
| MACMaxRate | the RateIndex corresponding to the maximum rate allowed by the Reverse Traffic Channel MAC protocol |
| TargetRate | the RateIndex corresponding to the desired rate |
| SelectedRate | the RateIndex corresponding to the selected rate |

For the first RTAP Test packet, the terminal sets TargetRate to MinRate and further sets SelectedRate to the smaller of TargetRate and MACMaxRate. For each subsequent RTAP Test packet, the terminal selects the rate for the packet based on the following procedure:

TargetRate=TargetRate+1,

If (TargetRate>MaxRate) then TargetRate=MinRate, and

SelectedRate=Min (TargetRate, MACMaxRate).

The above procedure cycles through all supported rates, up to and limited by the MaxRate specified by the RTAPParameterAssignment message and the MACMaxRate allowed by the MAC protocol. If the terminal transmits a Reverse Traffic Channel packet containing an RTAP Test packet at a rate with RateIndex i, it increments the associated sequence number for the transmitted RTAP Test packet by incrementing the variable $V_i(S_{Rev})$.

If the terminal receives a ConnectedState.ConnectionClosed or a RouteUpdate.ConnectionLost indication, it does not attempt to establish a connection for transmission of any RTAP Test packets that may have remained in the queue.

In an embodiment, the access network maintains several variables, $V(R_{RTAP})$ and $X[i]$, to keep track of the RTAP Test packets. $V(R_{RTAP})$ is an 8-bit variable that corresponds to the sequence number of the next RTAP Test packet expected to be received by the access network, and $X[i]$ is an array of 12-bit variables, each of which corresponds to the sequence number of the next RTAP Test Packet expected to be contained in a Reverse Traffic Channel Physical Layer packet transmitted at a rate corresponding to RateIndex i. These variables are initialized by the access network upon receiving the first RTAP Test packet following receipt of an RTAPParameterComplete message. For the initialization, $V(R_{RTAP})$ is set to the RevSysTime field of the RTAP Test packet, and $X[i]$ is set to the Seq_i field of the first RTAP Test packet (for all possible values of i).

In an embodiment, for each RTAP Test packet received at a rate corresponding to RateIndex k, the access network processes the received packet based on the following procedure and using the value of the RevSysTime field in the received packet:

If RevSysTime≧$V(R_{RTAP})$, then
RTAPTestPktRecd[k] is incremented by 1,
RTAPTestTime is incremented by {RevSysTime−V(RRTAP)+1}, and
$V(R_{RTAP})$ is set to RevSysTime+1.
If RevSysTime <$V(R_{RTAP})$, then generate an RTAPSyncLost indication.

In an embodiment, the access network further processes the fields of the received RTAP Test packet using the values of the Seq_k fields (for all possible values of k) as follows:
RTAPTestPktSent[k] is incremented by {Seq_k−X[k]+1}, and
X[k] is set to Seq_k+1.

In an embodiment, operations and comparisons performed on sequence numbers are carried out in unsigned modulo $2^S$ arithmetic, where S denotes the number of bits used to represent the sequence number.

The reverse link performance may be determined based on the collected statistics. Some of the performance computations are described below. In the following, PhysLayerPktSize[i] gives the number of bits in a Physical Layer packet at a rate corresponding to RateIndex i.

Referring back to FIG. 2B, at terminal 106, controller 270 may be operated to generate the RTAP Test packets, which may be stored in buffer 280. At the appropriate time, the RTAP Test packets are retrieved from buffer 280, routed through multiplexer 284, and processed by TX data processor 286 for transmission over the Reverse Traffic Channel. Controller 270 may further provide a rate control to modulator 288 for the selected rates for the RTAP Test packets.

Referring back to FIG. 2A, at access point 104, the RTAP Test packets are processed by RX data processor 234 and provided to controller 220. Controller 220 then identifies and extracts various types of information from each RTAP Test packet (e.g., the rate and the sequence number of each received RTAP Test packet and the sequence numbers of the last transmitted packets for all possible rates). Controller 220 further updates the variables maintained for the rates based on the information extracted from the received RTAP Test packets, as described above. Controller 220 may further be operated to perform the computations described above for various reverse link performance metrics.

The above description represents one specific implementation of the inventive techniques. Fewer, additional, and/or different tests may be performed, and fewer, additional, and/or different statistics may be collected. Moreover, fewer, additional, and/or different procedures and messages may be provided, and each message may include fewer, additional, and/or different fields than those described above. Thus, various variations of the specific implementation described above may be contemplated and are within the scope of the invention.

For clarity, various aspects and embodiments of the invention have been specifically described for the high rate packet data in cdma2000. The techniques described herein may also be used for other CDMA and wireless communication systems. For example, these techniques may be used in W-CDMA systems. Various differences exist between cdma2000 HAI and W-CDMA, and the techniques described herein may be modified for use in W-CDMA (e.g., modified to account for the difference in signal processing).

$$\text{Throughput(Kbps) for a rate with } RateIndex\ i =$$

$$RTAPTestPktRecd[i] \times PhysLayerPktSize[i]/(RTAPTestTime \times 16 \times 5/3).$$

$$\text{Overall throughput(Kbps)} =$$

$$\left(\sum_i RTAPTestPktRecd[i] \times PhysLayerPktSize[i]\right)/(RTAPTestTime \times 16 \times 5/3).$$

$$\text{Packet Error Rate(\%) for a rate with } RateIndex\ i =$$

$$(RTAPTestPktSent[i] - RTAPTestPktRecd[i] \times 100/RTAPTestPktSent[i].$$

$$\text{Overall Packet Error Rate(\%)} =$$

$$\sum_i (RTAPTestPktSent[i] - RTAPTestPktRecd[i] \times 100/RTAPTestPktSent[i].$$

The techniques described herein may be implemented by various means. For example, the techniques may be implemented in hardware, software, or a combination thereof. For a hardware implementation, the elements used for testing and statistics collection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the elements used for testing and statistics collection may be implemented with modules (e.g., procedures, functions, and so on) that perform the functions described herein. The software codes may be stored in a memory unit (e.g., memories 222 and 272 in FIGS. 2A and 2B) and executed by a processor (e.g., controllers 220 and 270 in FIGS. 2A and 2B). The memory unit may be implemented within the processor or external to the processor, in which case it can be communicatively coupled to the processor via various means as it is known in the art.

Headings are included herein for reference and to aid in the locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for testing forward link for specific configuration of one or more auxiliary channels in a wireless data communication system, comprising:
    receiving a first message having included therein test settings selected from among a plurality of possible test settings for one or more auxiliary channels used to carry signaling for data transmission on the forward link for the one or more auxiliary channels, wherein the test settings selected comprise indications for configuring each auxiliary channel and indications of procedures to be performed by each auxiliary channel during testing, and wherein the first message includes a test setting indicative of maintenance of a test mode in an event of a connection closure or a lost connection;
    configuring each auxiliary channel based on test settings applicable to the auxiliary channel;
    transmitting an indication of configuration completion within a predetermined time interval of having received the first message; and
    transmitting each configured auxiliary channel in accordance with the applicable test settings to test the configured auxiliary channel.

2. The method of claim 1, wherein each test setting is provided via a respective record in the first message.

3. The method of claim 1, wherein the one or more auxiliary channels comprise at least one of an acknowledgement (ACK) channel and a data rate control (DRC) channel.

4. The method of claim 1, wherein the first message includes a test setting for a particular bit value to be transmitted on an acknowledgment (ACK) channel.

5. The method of claim 1, wherein the first message includes a test setting for a particular value to be transmitted on a data rate control (DRC) channel.

6. The method of claim 1, wherein the first message includes a test setting for a particular cover to be used for a data rate control (DRC) channel.

\* \* \* \* \*